United States Patent
Akazawa et al.

(10) Patent No.: US 10,775,316 B2
(45) Date of Patent: Sep. 15, 2020

(54) INSPECTION SYSTEM AND INSPECTION METHOD

(71) Applicants: RICOH ELEMEX CORPORATION, Aichi (JP); KOCHI PREFECTURAL PUBLIC UNIVERSITY CORPORATION, Kochi (JP)

(72) Inventors: Keiichi Akazawa, Aichi (JP); Yasuyuki Inoue, Aichi (JP); Toru Kurihara, Kochi (JP)

(73) Assignees: RICOH ELEMEX CORPORATION, Aichi (JP); KOCHI PREFECTURAL PUBLIC UNIVERSITY CORPORATION, Kochi (JP)

( * ) Notice: Subject to any disclaimer, the term of this patent is extended or adjusted under 35 U.S.C. 154(b) by 0 days.

(21) Appl. No.: 16/490,512

(22) PCT Filed: Mar. 2, 2018

(86) PCT No.: PCT/JP2018/008071
§ 371 (c)(1),
(2) Date: Aug. 30, 2019

(87) PCT Pub. No.: WO2018/159825
PCT Pub. Date: Sep. 7, 2018

(65) Prior Publication Data
US 2020/0011810 A1    Jan. 9, 2020

(30) Foreign Application Priority Data

Mar. 3, 2017 (JP) ................................ 2017-041045

(51) Int. Cl.
*G01N 21/88* (2006.01)
*G01B 11/30* (2006.01)

(52) U.S. Cl.
CPC .......... *G01N 21/8851* (2013.01); *G01B 11/30* (2013.01); *G01N 21/88* (2013.01); *G01N 21/8806* (2013.01)

(58) Field of Classification Search
CPC ........... G01N 21/8851; G01N 21/8806; G01N 21/88; G01N 21/93; G01N 21/8901;
(Continued)

(56) References Cited

U.S. PATENT DOCUMENTS 6,421,629 B1 * 7/2002 Ishiyama ............. G01B 11/255
702/159
2010/0328649 A1   12/2010 Ota et al.
(Continued)

FOREIGN PATENT DOCUMENTS

JP   2004-334580 A   11/2004
JP   2011-007576 A   1/2011
(Continued)

OTHER PUBLICATIONS

International Search Report issued in corresponding International Patent Application No. PCT/JP2018/008071, dated May 22, 2018, with English translation.

*Primary Examiner* — Christina A Riddle
(74) *Attorney, Agent, or Firm* — McDermott Will & Emery LLP

(57) ABSTRACT

An inspection system according to one embodiment includes: a first signal output unit that outputs to an illumination unit a first signal serving as a trigger to start outputting stripe patterns; a second signal output unit that outputs to the illumination unit a second signal serving as a trigger to switch the stripe patterns; an image-data acquisition unit that acquires time-correlation image data by starting superimposition of frames output from an image sensor at a timing based on the first signal; an image generation unit that generates a first time-correlation image and a second time-
(Continued)

correlation image based on the time-correlation image data, the first time-correlation image corresponding to a first stripe pattern alone, the second time-correlation image corresponding to a second stripe pattern alone; and an abnormality detection unit that detects, based on the first time-correlation image and the second time-correlation image, an abnormality on the inspection target surface.

5 Claims, 19 Drawing Sheets

(58) Field of Classification Search
CPC ... G01N 2021/8829; G01N 2021/8835; G01N 2021/8809; G01N 2021/8896; G01N 2201/0625; G01N 2201/0634; G01N 2201/0626; G01B 11/02; G01B 11/022; G01B 11/06; G01B 11/0625; G01B 11/0691; G01B 11/2527; G01B 11/2531; G01B 11/2536; G06K 9/36; G06K 9/46; G06K 9/4604; G06T 2207/10152; G06T 7/521; G01M 11/005
USPC .......... 356/237.1–237.6, 625–630, 388, 390, 356/395, 398, 32, 445, 601–613; 348/128
See application file for complete search history.

(56) References Cited

U.S. PATENT DOCUMENTS

| | | | |
|---|---|---|---|
| 2013/0278787 A1 | 10/2013 | Shpunt | |
| 2017/0115230 A1* | 4/2017 | Kurihara | ............ G01N 21/8806 |

FOREIGN PATENT DOCUMENTS

| | | | | |
|---|---|---|---|---|
| JP | 2015-197345 A | 11/2015 | | |
| JP | 2017-101976 A | 6/2017 | | |
| WO | WO-2015152307 A1 * | 10/2015 | ......... | G01N 21/8806 |

* cited by examiner

ONE PERIOD

SCROLL → x DIRECTION

INSPECTION SYSTEM AND INSPECTION METHOD

CROSS-REFERENCE TO RELATED APPLICATIONS

This application is a national stage application of International Application No. PCT/JP2018/008071, filed Mar. 2, 2018, which designates the United States, incorporated herein by reference, and which is based upon and claims the benefit of priority from Japanese Patent Application No. 2017-041045, filed Mar. 3, 2017, the entire contents of which are incorporated herein by reference.

TECHNICAL FIELD

Embodiments of the present invention relate to an inspection system and an inspection method.

BACKGROUND ART

Conventionally, there has been developed a technique that acquires, by irradiating an inspection subject with light such as a stripe pattern that changes periodically and capturing the reflected light from the surface of the inspection subject, a time-correlation image including not only information on the intensity of the light but also information on time transition of the light. Such a time-correlation image is used to detect an abnormality of the inspection subject, for example.

SUMMARY OF INVENTION

Problem to be Solved by the Invention

In the abnormality detection using the time-correlation image as in the foregoing, in order to detect the abnormality more accurately, it may need to perform inspection using a plurality of time-correlation images obtainable by moving a plurality of types of stripe patterns, for example, two types of respective stripe patterns extending in two directions orthogonal to each other.

However, conventionally, in order to obtain the time-correlation image corresponding to each of the two types of stripe patterns, it is general to perform correlation calculation (frame superimposition) by continuously outputting one of the stripe patterns and then to temporarily stop the output of the one of the stripe patterns, and thereafter, to newly read the other of the stripe patterns and then to perform the correlation calculation by continuously outputting only the other of the stripe patterns. Accordingly, conventionally, it takes time for switching the stripe patterns, and to that extent, the takt time (cycle time) needed for the inspection has been relatively long.

Thus, it is desirable to shorten the takt time (cycle time) needed for the inspection.

Means for Solving Problem

An inspection system according to one embodiment includes: an illumination unit that provides periodic temporal changes and spatial changes in intensity of light to an inspection subject by sequentially and seamlessly switching and outputting a plurality of stripe patterns so that a first stripe pattern extending in a first direction moves in a second direction intersecting with the first direction for one period and thereafter a second stripe pattern extending in the second direction moves in the first direction for one period; a first signal output unit that outputs to the illumination unit a first signal serving as a trigger to start outputting the stripe patterns; a second signal output unit that outputs to the illumination unit a second signal serving as a trigger to switch the stripe patterns; an image sensor used in a time-correlation camera or in an image capturing system that performs an operation equivalent to that of the time-correlation camera; an image-data acquisition unit that acquires, by starting superimposition of frames output from the image sensor at a timing based on the first signal, time-correlation image data in which an inspection target surface of the inspection subject being illuminated by the illumination unit is captured; an image generation unit that generates a first time-correlation image and a second time-correlation image based on the time-correlation image data, the first time-correlation image corresponding to the first stripe pattern alone, the second time-correlation image corresponding to the second stripe pattern alone; and an abnormality detection unit that detects, based on the first time-correlation image and the second time-correlation image, an abnormality on the inspection target surface.

DESCRIPTION OF EMBODIMENTS

First Embodiment

Figure 1:
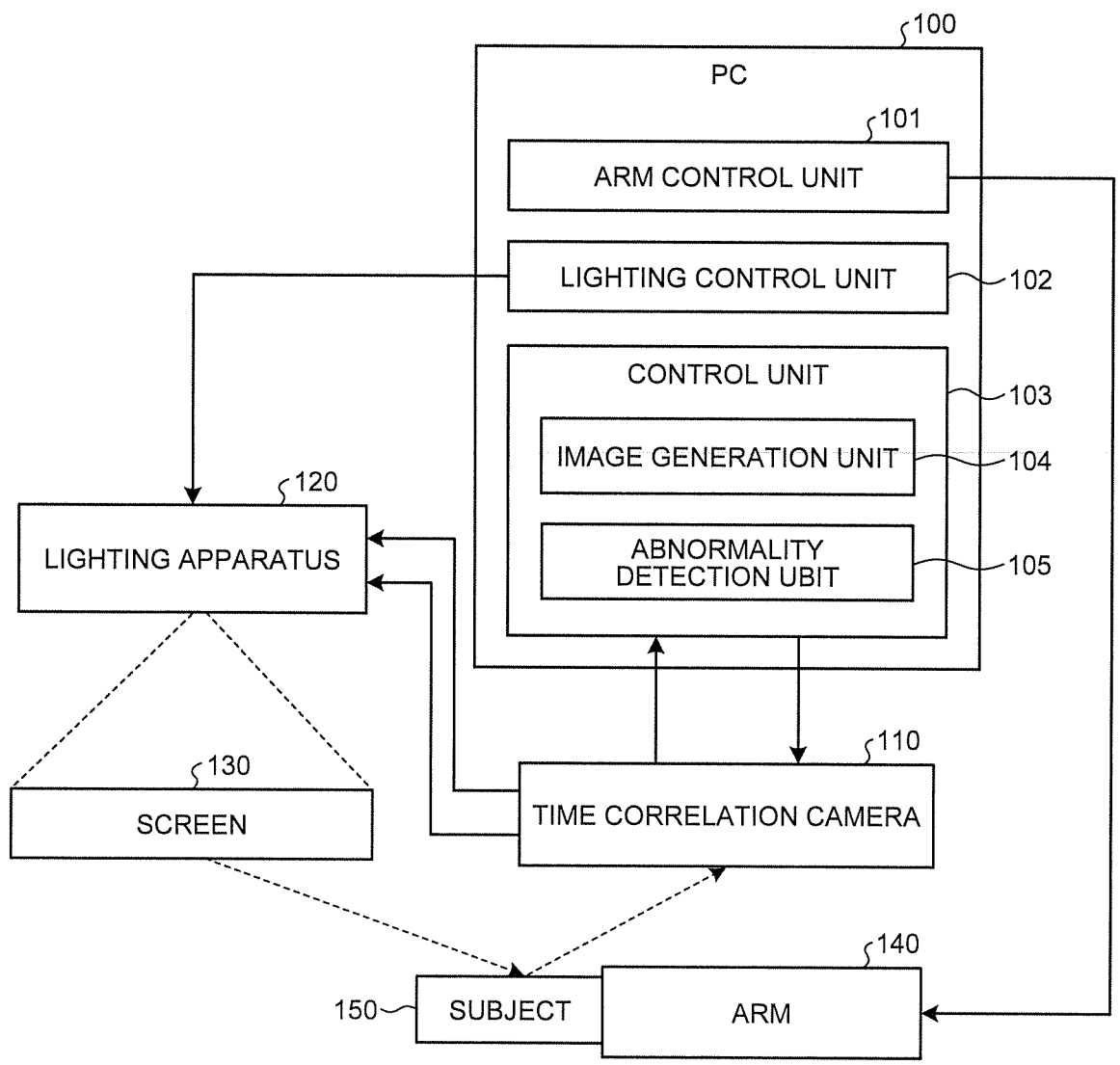
FIG. 1 is an exemplary block diagram illustrating a configuration of an inspection system according to a first embodiment.

The following describes an inspection system according to a first embodiment. The inspection system of the first embodiment includes various configurations in order to inspect an inspection subject. FIG. 1 is an exemplary block diagram illustrating a configuration of the inspection system in the first embodiment. As illustrated in FIG. 1, the inspection system of the first embodiment includes a PC 100, a time-correlation camera 110, a lighting apparatus 120, a screen 130, and an arm 140. In the first embodiment, a combination of the lighting apparatus 123 and the screen 13 is one example of a "illumination unit".

The arm 140 is used to fix an inspection subject 150 and changes, in response to the control from the PC 100, the position and orientation of the surface of the inspection subject 150 that the time-correlation camera 110 can capture an image.

The lighting apparatus 120 is a device that irradiates the inspection subject 150 with light and can control the intensity of light to emit for every area in accordance with an illumination pattern (such as a stripe pattern described later) specified by the PC 100 or the like. Moreover, the lighting apparatus 120 can control the intensity of light for every area in accordance with periodic time transition. In other words, the lighting apparatus 120 can provide periodic temporal changes and spatial changes in the intensity of light. A specific control method of the intensity of light will be described later.

The screen 130 irradiates, after diffusing the light output from the lighting apparatus 120, the inspection subject 150 with the light in a planar manner. The screen 130 of the first embodiment irradiates the inspection subject 150 in a planar manner with the light that is input from the lighting apparatus 120 and is provided with the periodic temporal changes and spatial changes. Between the lighting apparatus 120 and the screen 130, an optical system component (not depicted) such as a Fresnel lens for light condensing may be provided.

In the first embodiment, an example in which a planar illumination unit that provides the periodic temporal changes and the spatial changes in light intensity is configured by a combination of the lighting apparatus 120 and the screen 130 will be described, but the illumination unit is not limited to such a combination. For example, the illumination unit may be configured by LEDs that are arranged in a planar manner or a large monitor.

Figure 2:
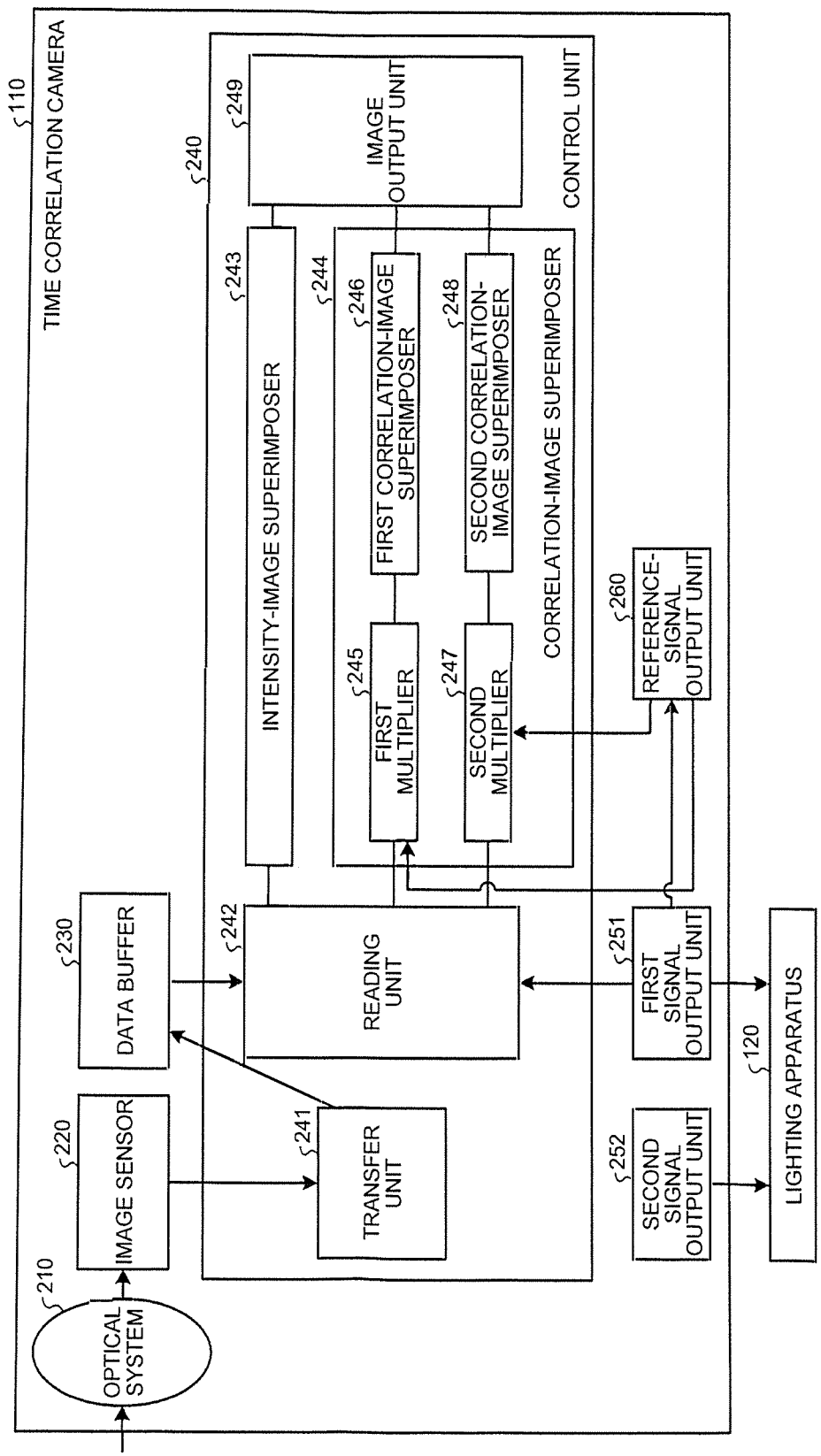
FIG. 2 is an exemplary block diagram illustrating a configuration of a time-correlation camera in the first embodiment.

FIG. 2 is an exemplary block diagram illustrating the time-correlation camera 110 in the first embodiment. As illustrated in FIG. 2, the time-correlation camera 110 includes an optical system 210, an image sensor 220, a data buffer 230, a control unit 240, a first signal output unit 251, a second signal output unit 252, and a reference-signal output unit 260.

The optical system 210 includes an imaging lens and the like. The optical system 210 transmits a light flux from a photographic subject (including the inspection subject 150) located outside of the time-correlation camera 110, and forms an optical image of the photographic subject formed by the light flux.

The image sensor 220 is a sensor capable of outputting the intensity of light entered through the optical system 210 for each pixel at high speed as a light intensity signal.

The light intensity signal of the first embodiment is obtained by emitting the light from the lighting apparatus 120 of the inspection system to the photographic subject (including the inspection subject 150) and receiving the reflected light from the photographic subject with the image sensor 220.

The image sensor 220 is a sensor capable of reading at high speed as compared with a conventional sensor, and is configured in a two-dimensional plane shape in which pixels are arrayed in two types of directions of row direction (x direction) and column direction (y direction), for example. Each pixel of the image sensor 220 is defined as pixel P (1, 1), ..., P (i, j), ..., and P (X, Y) (an image size in the first embodiment is assumed to be X×Y). The reading speed of the image sensor 220 is not limited, and may be the same as that of a conventional sensor.

The image sensor 220 receives the light flux from the photographic subject (including the inspection subject 150) transmitted through the optical system 210 and performs photoelectric conversion on it. As a result, the image sensor 220 generates a two-dimensional planar frame made up of the light intensity signals (imaging signals) indicating the intensity of the light that has been reflected from the photographic subject, and outputs it to the control unit 240. The image sensor 220 of the first embodiment outputs, for each readable unit time, the two-dimensional planar frame.

The control unit 240 of the first embodiment includes a hardware configuration such as a CPU, a ROM, and a RAM, for example. The CPU implements, by executing programs stored in the ROM, a transfer unit 241, a reading unit 242, an intensity-image superimposer 243, a correlation-image superimposer 244, and an image output unit 249. In the first embodiment, the correlation-image superimposer 244 is one example of an "image-data acquisition unit". The correlation-image superimposer 244 includes a first multiplier 245, a first correlation-image superimposer 246, a second multiplier 247, and a second correlation-image superimposer 248. The first embodiment does not limit these functional configurations to being implemented by the cooperation of the CPU and the programs, that is, hardware and software. In the first embodiment, the above-described functional configurations may be implemented only by the hardware such as an FPGA, an ASIC, and the like.

The transfer unit 241 stores in chronological order, into the data buffer 230, a frame that is output from the image sensor 220 and is made up of the light intensity signals.

The data buffer 230 stores therein the frame that is output from the image sensor 220 in chronological order.

Figure 3:
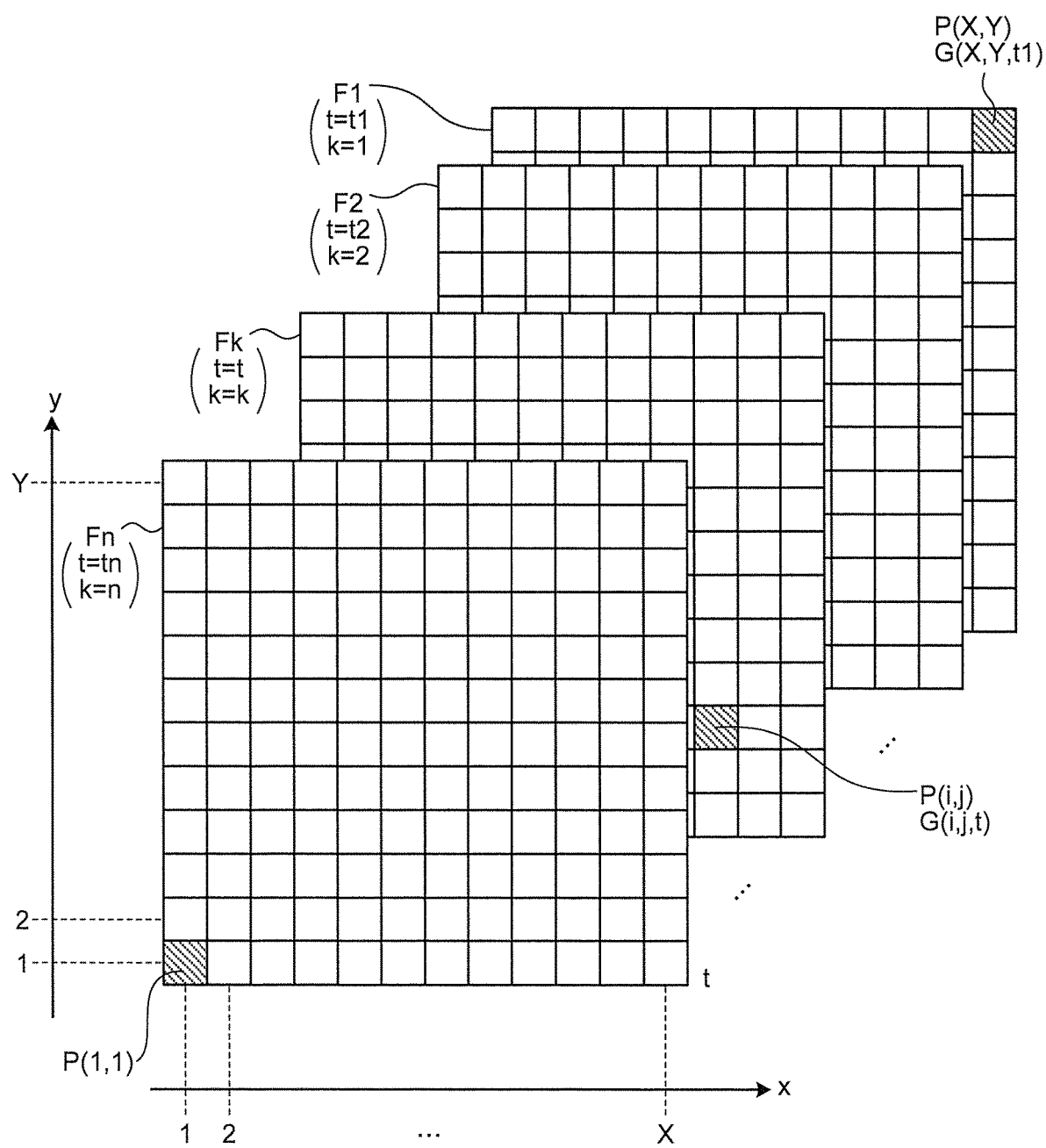
FIG. 3 is an exemplary diagram conceptually illustrating frames that are stored in chronological order in the time-correlation camera in the first embodiment.

FIG. 3 is an exemplary diagram conceptually illustrating the frames that are stored in chronological order in the time-correlation camera 110 in the first embodiment. As illustrated in FIG. 3, in the data buffer 230 of the first embodiment, a plurality of frames Fk (k=1, 2, ..., n) made up of combinations of a plurality of light intensity signals G (1, 1, t), ..., G (i, j, t), ..., and G (X, Y, t) for each time t (t=t0, t1, t2, ..., tn) are stored in chronological order. A single frame (image) generated at the time t is made up of the light intensity signals G (1, 1, t), ..., G (i, j, t), ..., and G (X, Y, t). The light intensity signal may also be referred to as a capturing signal.

The light intensity signals G (1, 1, t), ..., G (i, j, t), ..., and G (X, Y, t) of the first embodiment are associated with the pixels P (1, 1), ..., P (i, j), ..., and P (X, Y) that constitute the frames Fk (k=1, 2, ..., n).

The frame output from the image sensor 220 is composed of only the light intensity signals, and in other words, it can also be considered as image data in monochrome. In the first embodiment, in consideration of resolution, sensitivity, cost, and the like, an example in which the image sensor 220 generates image data in monochrome will be described. However, the image sensor 220 is not limited to a monochrome image sensor, and may be a color image sensor.

Referring back to FIG. 2, the reading unit 242 of the first embodiment reads out the light intensity signals G (1, 1, t), ..., G (i, j, t), ..., and G (X, Y, t) in frame units in chronological order from the data buffer 230, and outputs the read-out data to the intensity-image superimposer 243 and the correlation-image superimposer 244. The timing at which the reading unit 242 of the first embodiment starts the reading will be described later, and thus the explanation thereof is omitted here.

The time-correlation camera 110 of the first embodiment generates (outputs) image data for each output destination of the reading unit 242. That is, the time-correlation camera 110 outputs, broadly speaking, two types of image data corresponding to two output destinations (the intensity-image superimposer 243 and the correlation-image superimposer 244).

More specifically, the time-correlation camera 110 of the first embodiment outputs, as the two types of image data, intensity image data generated by the intensity-image superimposer 243 and time-correlation image data generated by the correlation-image superimposer 244. In the first embodiment, the time-correlation image data generated by the correlation-image superimposer 244 has two types of data: the time-correlation image data generated by the combination of the first multiplier 245 and the first correlation-image superimposer 246; and the time-correlation image data generated by the combination of the second multiplier 247 and the second correlation-image superimposer 248. Thus, in the first embodiment, generated are a total of three types of image data: the intensity image data; and the two types of time-correlation image data. The technique of the first embodiment is not limited to generating the three types of image data, and a situation where no intensity image data is generated or a situation where the time-correlation image data of a single type or three or more types is generated is also conceivable.

As in the foregoing, the image sensor 220 of the first embodiment outputs for each readable time unit the frame composed of the light intensity signals. However, in order to generate normal image data, the light intensity signals for the exposure time needed to capture an image are necessary. Consequently, in the first embodiment, the intensity-image superimposer 243 superposes a plurality of frames for the exposure time needed to capture an image, and generates (acquires) the intensity image data. Each pixel value (a value representing light intensity) G (x, y) of an image (intensity image) that the intensity image data is imaged can be derived from the following Expression (1). The exposure time is assumed to be a time difference between t0 and tn.

$$G(x,y) = \int_{t_0}^{t_n} G(x,y,t)dt \quad (1)$$

As a result, as capturing with a conventional camera, it is possible to generate (acquire) the intensity image data in which the photographic subject (including the inspection subject 150) has been captured. The intensity-image superimposer 243 outputs the generated intensity image data to the image output unit 249.

The time-correlation image data is image data indicating the changes in the intensity of light corresponding to time transition. In the first embodiment, each time the reading unit 242 reads out the frame, the first multiplier 245 and the second multiplier 247 multiply the light intensity signal included in the frame by a reference signal representing the time transition and then generate (acquire) a time-correlation value frame composed of a time-correlation value that is a multiplication result of the reference signal and the light intensity signal. The first correlation-image superimposer 246 and the second correlation-image superimposer 248 generate (acquire) the time-correlation image data by superposing a plurality of time-correlation value frames generated by the first multiplier 245 and the second multiplier 247, respectively.

Incidentally, in order to detect an abnormality of the inspection subject 150 on the basis of the time-correlation image data, the changes in the light intensity signal input to the image sensor 220 and the changes in the value of the reference signal need to be synchronized. In this point, as in the foregoing, the lighting apparatus 120 of the first embodiment performs, via the screen 130, the planar irradiation of light that provides periodic temporal changes and spatial changes in light intensity. Accordingly, in the first embodiment, as will be described in the following, as the reference signal, used is a signal for which the value changes periodically corresponding to the changes in the intensity of light that is provided by the lighting apparatus 120.

In the first embodiment, two types of time-correlation image data are generated. As in the foregoing, the reference signal only needs to be a signal representing the time transition. In the first embodiment, as one example, a reference signal corresponding to a complex sine wave $e^{-j\omega t}$ is used. In this complex sine wave $e^{-j\omega t}$, it is assumed that e represents a Napier number, j represents an imaginary unit, ω represents an angular frequency, and t represents time. In the first embodiment, the angular frequency ω is set such that the complex sine wave $e^{-j\omega t}$ representing the reference signal correlates with the above-described exposure time, that is, one period of the time needed to generate the intensity image data and the time-correlation image data. The planar and dynamic light formed by the illumination unit such as the lighting apparatus 120 and the screen 130 provides, at each location on the surface (reflecting surface) of the inspection subject 150, the temporal changes in irradiation intensity at a first period (temporal period) and also provides spatial increase/decrease distribution of irradiation intensity at a second period (spatial period) along at least one direction lying along the surface. This planar light is, when reflected at the surface, subjected to complex modulation in accordance with the specifications of the surface (such as the distribution of normal vectors). The time-correlation camera 110 acquires the time-correlation image data as a complex signal by receiving the light that has been complex-modulated at the surface and by performing quadrature detection (quadrature demodulation) by use of the reference signal of the first period. By the modulation and demodulation based on such time-correlation image data as a complex number, it is possible to detect a feature that corresponds to the distribution of normal vectors of the surface.

The complex sine wave $e^{-j\omega t}$ can also be expressed as $e^{-j\omega t} = \cos \omega t - j \cdot \sin \omega t$. Accordingly, each pixel value C (x, y) of the time-correlation image data can be derived from the following Expression (2).

$$C(x, y) = \int_{t0}^{tn} G(x, y, t) \cdot e^{-j\omega t} dt \quad (2)$$
$$= \int_{t0}^{tn} G(x, y, t) \cdot (\cos \omega t - j \cdot \sin \omega t) dt$$

In the first embodiment, two types of time-correlation image data expressed by Expression (2) are generated, and each of the two types of time-correlation image data is separately generated into a pixel value C1 (x, y) that represents a real part and a pixel value C2 (x, y) that represents an imaginary part.

The reference-signal output unit 260 of the first embodiment outputs different reference signals respectively to the first multiplier 245 and the second multiplier 247. For example, the reference-signal output unit 260 outputs a reference signal cos ωt corresponding to the real part of the complex sine wave $e^{-j\omega t}$ to the first multiplier 245, and outputs a reference signal sin ωt corresponding to the imaginary part of the complex sine wave $e^{-j\omega t}$ to the second multiplier 247. Although an example in which the reference-signal output unit 260 outputs two types of reference signals that are expressed as time functions of a sine wave and a cosine wave, which form a Hilbert transform pair with each other, will be described, the reference signal may be any signal as long as it is a signal that changes in response to the time transition such as a time function.

The first multiplier 245 multiplies, for each time a frame is input from the reading unit 242, the light intensity signal of the frame by the real part cos ωt of the complex sine wave $e^{-j\omega t}$ input from the reference-signal output unit 260.

Then, the first correlation-image superimposer 246 performs, on a plurality of frames for the exposure time needed to capture an image, the processing of superposing a multiplication result of the first multiplier 245 for each pixel. Thus, each pixel value C1 (x, y) of one of the two types of time-correlation image data is derived from the following Expression (3).

$$C1(x,y)=\int_{t0}^{tn}(G(x,y,t) \cdot \cos \omega t) dt \quad (3)$$

Meanwhile, the second multiplier 247 multiplies, for each time a frame is input from the reading unit 242, the light intensity signal of the frame by the imaginary part sin ωt of the complex sine wave $e^{-j\omega t}$ input from the reference-signal output unit 260.

Then, the second correlation-image superimposer 248 performs, on a plurality of frames for the exposure time needed to capture an image, the processing of superposing a multiplication result of the second multiplier 247 for each pixel. Thus, each pixel value C2 (x, y) of the other of the two types of time-correlation image data is derived from the following Expression (4).

$$C2(x,y)=\int_{t0}^{tn}(G(x,y,t) \cdot \sin \omega t) dt \quad (4)$$

By the above-described processing, it is possible to generate two types of time-correlation image data, in other words, time-correlation image data having two degrees of freedom.

Note that the first embodiment does not limit the type of reference signal. In the first embodiment, as one example, an example in which two types of time-correlation image data corresponding to the real part and the imaginary part of the complex sine wave $e^{-j\omega t}$ are generated will be described, but two types of time-correlation image data corresponding to the amplitude of light and the phase of light may be generated.

Furthermore, the time-correlation camera 110 of the first embodiment is capable of generating the time-correlation image data for a plurality of systems. Thus, according to the time-correlation camera 110 of the first embodiment, when emitting light for which stripes of a plurality of types of width are combined, it is possible to generate two types of time-correlation image data corresponding to the above-described real part and the imaginary part for the systems for each stripe width, for example. In this case, the time-correlation camera 110 needs to be provided with a plurality of combinations each composed of two multipliers and two correlation-image superimposers for the systems, and the reference-signal output unit 260 needs to output the reference signal by the angular frequency c suitable for each system.

In the example illustrated in FIG. 2, the image output unit 249 outputs two types of time-correlation image data and the intensity image data to the PC 100 (see FIG. 1). Then, the PC 100 detects an abnormality of the inspection subject 150 by using images (time-correlation image and intensity image)

that the time-correlation image data and the intensity image data have been imaged. Thus, in the first embodiment, in order to detect an abnormality of the inspection subject 150, it needs to irradiate the inspection subject 150 with the light for providing (periodic) temporal changes and spatial changes in the intensity of light.

Figure 4:
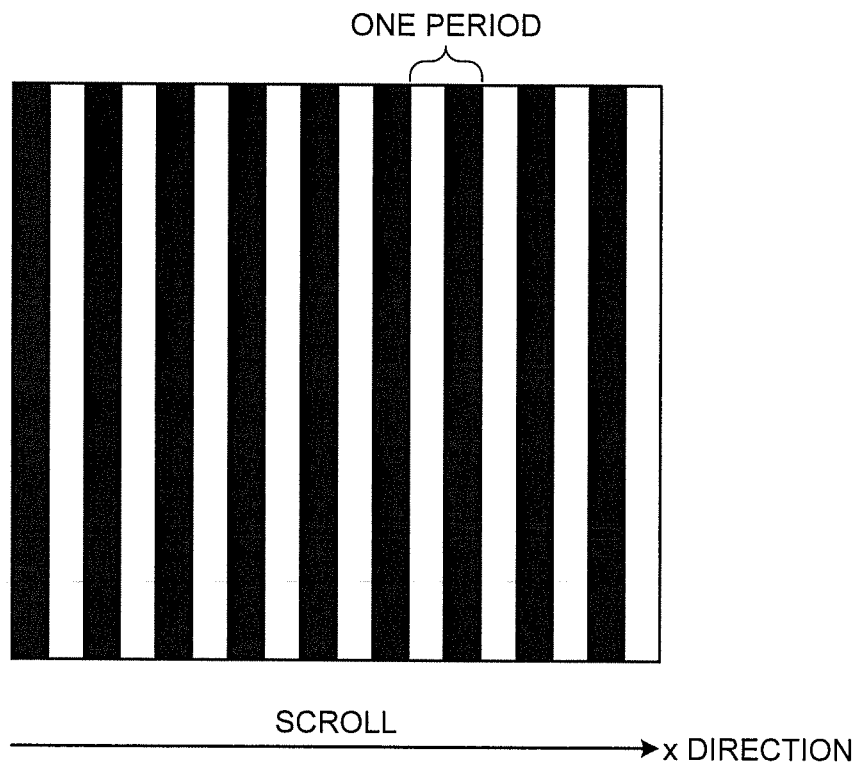
FIG. 4 is an exemplary diagram illustrating one example of a stripe pattern emitted by a lighting apparatus in the first embodiment.

The lighting apparatus 120 of the first embodiment emits, as one example, a stripe pattern that moves at high speed. FIG. 4 is an exemplary diagram illustrating one example of a stripe pattern emitted by the lighting apparatus 120 in the first embodiment. In the example illustrated in FIG. 4, the stripe pattern is scrolled (moved) in the x direction. White areas are light areas corresponding to stripes and black areas are interval areas (shade areas) corresponding to areas between stripes.

In the first embodiment, the stripe pattern emitted by the lighting apparatus 120 is moved for one period with the exposure time needed for the time-correlation camera 110 to capture the intensity image data and the time-correlation image data. Accordingly, the lighting apparatus 120 provides, on the basis of the spatial movement of the stripe pattern, periodic temporal changes in the light intensity to the inspection subject 150. In the first embodiment, because the time for which the stripe pattern of FIG. 4 moves in one period corresponds to the exposure time, in each pixel of an image (time-correlation image) that the time-correlation image data has been imaged, at least, information concerning the light intensity signal in one period of the stripe pattern is embedded.

As illustrated in FIG. 4, in the first embodiment, an example in which the lighting apparatus 120 emits a stripe pattern based on a rectangular wave is described, but waves other than the rectangular wave may be used. In the first embodiment, as the lighting apparatus 120 emits light via the screen 130, it is possible to blur the boundary area of light and shade of the rectangular wave.

In the first embodiment, the stripe pattern emitted by the lighting apparatus 120 is expressed as A (1+cos (ωt+kx)). That is, the stripe pattern repeatedly (periodically) includes a plurality of stripes. It is assumed that the intensity of light with which the inspection subject 150 is irradiated is adjustable between 0 and 2A and the phase of light is kx. k is the number of waves of the stripes. x is a direction in which the phase changes.

From the above-described expression of the stripe pattern, the fundamental frequency component of the light intensity signal f (x, y, t) of each pixel of the frame when the lighting apparatus 120 emitted light can be expressed as the following Expression (5). As expressed in Expression (5), the light and shade of the stripes change in the x direction.

$$f(x, y, t) = A(1 + \cos(\omega t + kx)) = A + A/2\{e^{j(\omega t + kx)} + e^{-j(\omega t + kx)}\} \quad (5)$$

As expressed by Expression (5), the intensity signal of the stripe pattern that the lighting apparatus 120 emits can be considered as a complex number.

The light from the lighting apparatus 120 that is reflected from the photographic subject (including the inspection subject 150) is input to the image sensor 220.

Thus, the light intensity signal G (x, y, t) input to the image sensor 220 can be identified with the light intensity signal f (x, y, t) of each pixel of the frame when the lighting apparatus 120 emitted the light. Consequently, by substituting Expression (5) into Expression (1) for deriving the intensity image data, Expression (6) can be derived. It is assumed that the phase is kx.

$$G(x, y) = \int_0^T f(x, y, t)dt = \int_0^T \left\{ A + \frac{A}{2}(e^{j(\omega t + kx)} + e^{-j(\omega t + kx)}) \right\} dt = AT \quad (6)$$

From Expression (6), it can be found that a value obtained by multiplying the exposure time T by an intermediate value A of the intensity of the light output by the lighting apparatus 120 is input in each pixel of an image (intensity image) that the intensity image data has been imaged. Moreover, by substituting Expression (5) into Expression (2) for deriving the time-correlation image data, Expression (7) can be derived. It is assumed that AT/2 is the amplitude and kx is the phase.

$$\begin{aligned} C(x, y) &= \int_0^T f(x, y, t)e^{-j\omega t}dt \\ &= \int_0^T \left\{ A + \frac{A}{2}(e^{j(\omega t + kx)} + e^{-j(\omega t + kx)}) \right\} e^{-j\omega t}dt \\ &= \frac{AT}{2}e^{jkx} \end{aligned} \quad (7)$$

As a result, the time-correlation image data expressed in a complex number expressed by Expression (7) can be substituted with the above-described two types of time-correlation image data. That is, the time-correlation image data composed of the above-described real part and the imaginary part includes phase changes and amplitude changes in the intensity changes in the light with which the inspection subject 150 has been irradiated. In other words, the PC 100 of the first embodiment can detect, on the basis of two types of time-correlation image data, the phase changes and the amplitude changes in the light that is emitted from the lighting apparatus 120. Consequently, the PC 100 of the first embodiment generates, on the basis of the time-correlation image data and the intensity image data, amplitude image data representing the amplitude changes in the entering light for each pixel and phase image data representing the phase changes in the entering light for each pixel.

Then, the PC 100 of the first embodiment detects an abnormality of the inspection subject 150, by image processing, on the basis of the images (amplitude image and phase image) that the generated amplitude image data and the phase image data have been imaged.

Incidentally, when an abnormality based on an unevenness is present in the surface shape of a general inspection subject including the inspection subject 150, the distribution of normal vectors of the surface of the general inspection subject changes according to the abnormality. Furthermore, when an abnormality that absorbs light is present on the surface of the inspection subject, change of intensity of the reflected light occurs. The change in the distribution of normal vectors is detected as at least one of the phase changes and the amplitude changes in the light. Thus, in the first embodiment, by using the time-correlation image data and the intensity image data, at least one of the phase changes and the amplitude changes in the light corresponding to the change in the distribution of normal vectors is detected. Accordingly, in the first embodiment, it is possible to detect the abnormality of the surface shape of the inspection subject. The relationship, in the first embodiment, among an abnormality of the inspection subject, normal vectors, and phase changes/amplitude changes in light will be described.

Figure 5:
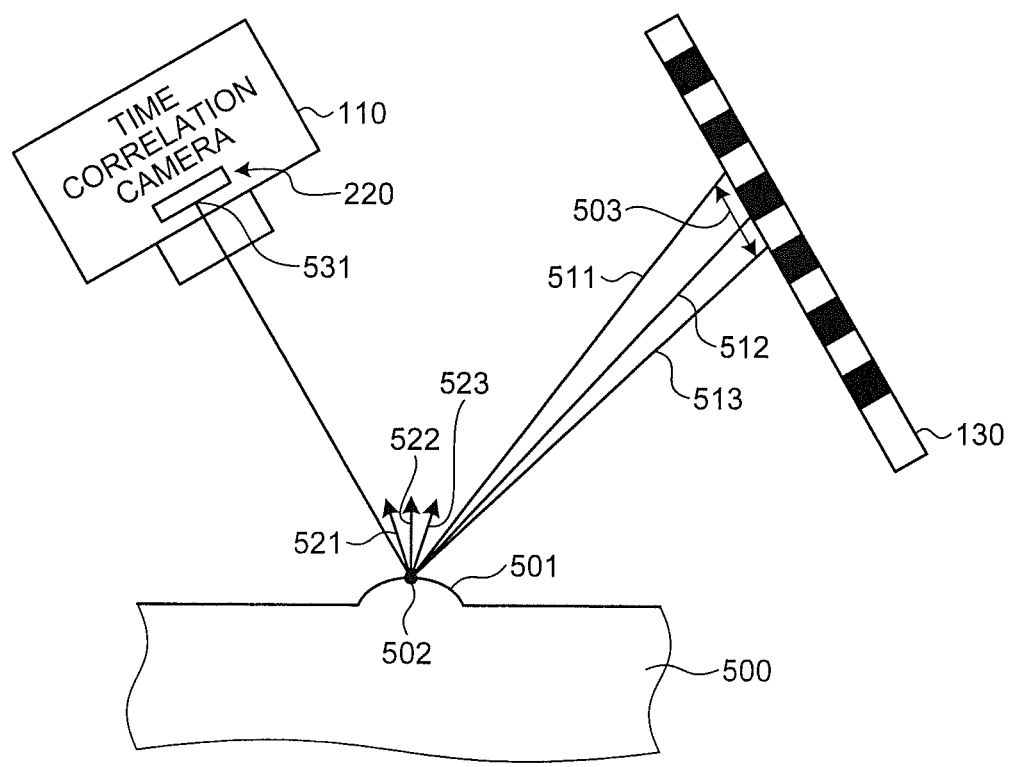
FIG. 5 is an exemplary diagram illustrating a first detection example of an abnormality of an inspection subject performed by the time-correlation camera in the first embodiment.

FIG. 5 is a diagram illustrating a first detection example of an abnormality of an inspection subject performed by the time-correlation camera 110 in the first embodiment. In the example illustrated in FIG. 5, there is an abnormality 501 of a projecting shape on an inspection subject 500. In this situation, in a vicinity area of a point 502 of the abnormality 501, it can be found that normal vectors 521, 522, and 523 are directed to different directions. The fact that the normal vectors 521, 522, and 523 are directed to different directions causes diffusion of the light reflected from the abnormality 501 (for example, lights 511, 512, and 513), and widens a width 503 of the stripe pattern entering any pixel 531 of the image sensor 220 of the time-correlation camera 110.

Figure 6:
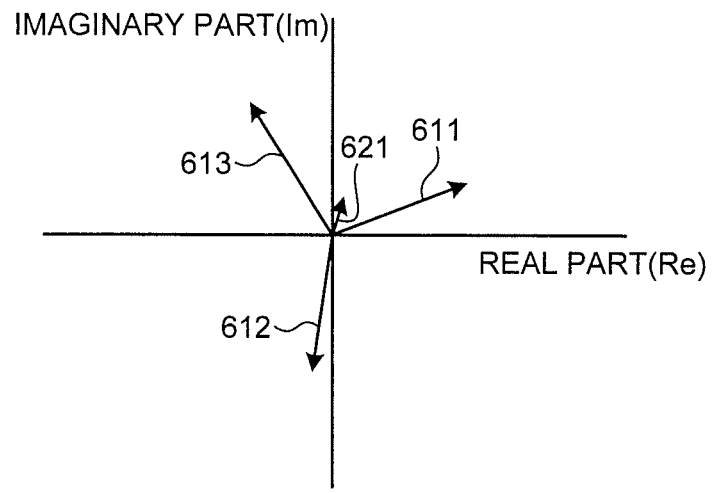
FIG. 6 is an exemplary diagram illustrating one example of the amplitude of light that, when the abnormality illustrated in FIG. 5 is present, changes according to the abnormality, in the first embodiment.

FIG. 6 is a diagram illustrating one example of the amplitude of light that, when the abnormality 501 illustrated in FIG. 5 is present, changes according to the abnormality 501, in the first embodiment. In the example illustrated in FIG. 6, the amplitude of light is illustrated on a two-dimensional plane in a state that a real part (Re) and an imaginary part (Im) are separated. In addition, in FIG. 6, light amplitudes 611, 612, and 613 corresponding to the lights 511, 512, and 513 in FIG. 5 are illustrated. The light amplitudes 611, 612, and 613 cancel out one another and the light of an amplitude 621 is input into any pixel 531 of the image sensor 220.

Accordingly, in the situation illustrated in FIG. 6, it can be found that the amplitude is small in the area where the abnormality 501 of the inspection subject 500 is captured. In other words, when there is an area that is dark as compared with the periphery in the amplitude image indicating the amplitude changes, it can be presumed that the cancellation of the amplitude of light occurs in the area, thereby being determined that the abnormality 501 is present at the location of the inspection subject 500 corresponding to the area.

Figure 7:
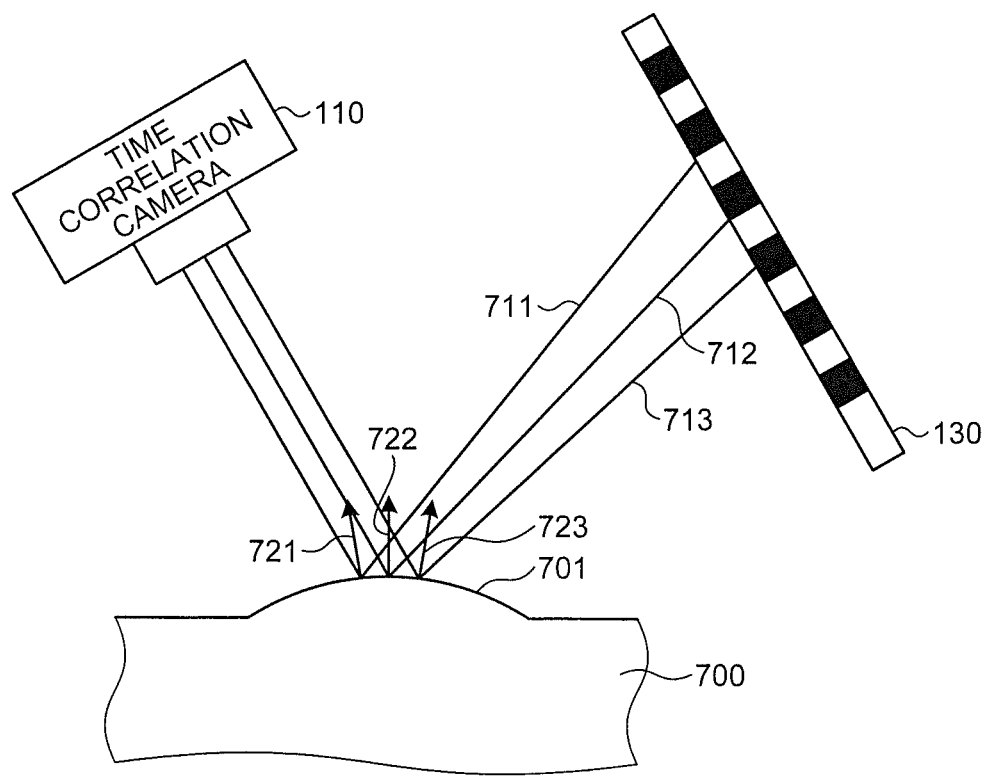
FIG. 7 is an exemplary diagram illustrating a second detection example of an abnormality of the inspection subject performed by the time-correlation camera in the first embodiment.

The inspection system of the first embodiment can detect not only an abnormality for which the slope changes steeply as with the abnormality 501 of FIG. 5 but also an abnormality that changes gradually. FIG. 7 is a diagram illustrating a second detection example of an abnormality of the inspection subject performed by the time-correlation camera 110 in the first embodiment. In general, when the inspection subject has no abnormality, the surface of the inspection subject is a plane (in other words, normal lines are parallel). However, in the example illustrated in FIG. 7, a gentle gradient 701 is formed on an inspection subject 700. In this situation, normal vectors 721, 722, and 723 on the gradient 701 also change gently in the same manner, and lights 711, 712, and 713 input to the image sensor 220 are gradually displaced. In the example illustrated in FIG. 7, because the cancellation of the amplitude of light does not occur due to the gentle gradient 701, the amplitude of light as illustrated in FIG. 5 and FIG. 6 hardly changes. However, in the example illustrated in FIG. 7, the light originally projected from the screen 130 is supposed to be input to the image sensor 220 in parallel as is, but due to the presence of the gentle gradient 701, the light projected from the screen 130 is not input to the image sensor 220 in parallel. Therefore, In the example illustrated in FIG. 7, phase of light changes. Accordingly, if a difference in the change pf phase of light from the periphery and the like is detected, it is possible to detect an abnormality due to the gentle gradient 701 as illustrated in FIG. 7.

Figure 8:
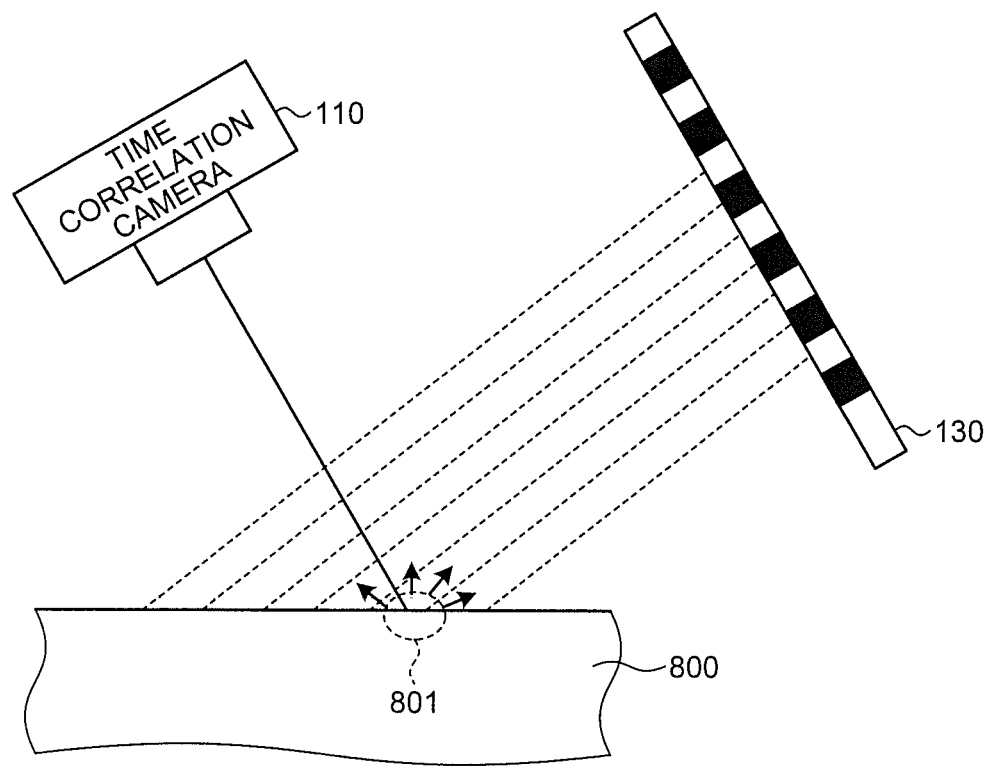
FIG. 8 is an exemplary diagram illustrating a third detection example of an abnormality of the inspection subject performed by the time-correlation camera in the first embodiment.

Furthermore, in the first embodiment, an abnormality due to a factor other than the surface shape of the inspection subject (in other words, the distribution of normal vectors of the inspection subject) may also be present. FIG. 8 is a diagram illustrating a third detection example of an abnormality of the inspection subject performed by the time-correlation camera 110 in the first embodiment. In the example illustrated in FIG. 8, dirt 801 adheres to an inspection subject 800. Thus, in the example illustrated in FIG. 8, the light emitted from the lighting apparatus 120 is absorbed into an area corresponding to the dirt 801, or the light emitted from the lighting apparatus 120 is diffusely reflected from the area corresponding to the dirt 801. Therefore, in the example illustrated in FIG. 8, the light hardly changes in intensity in any pixel region of the time-correlation camera 110 capturing the dirt 801. In other words, in the example illustrated in FIG. 8, in any pixel region capturing the dirt 801, canceling of the phase occurs in the light intensity to cancel the vibration component, so that the brightness is almost like a direct current.

As just described, in the pixel region capturing the dirt 801, the amplitude of light almost disappears, and thus, when the amplitude image is displayed, an area that is therefore dark as compared with the periphery is present. If this theory is used, it is possible to estimate that there is an abnormality such as the dirt 801 at the location of the inspection subject 800 corresponding to the dark region.

As described above, in the first embodiment, it is possible to estimate the presence of an abnormality on the inspection subject by detecting the amplitude changes in light and the phase changes in light on the basis of the time-correlation image (amplitude image and phase image).

Referring back to FIG. 1, the PC 100 will be described. The PC 100 performs control of the entire inspection system. The PC 100 includes an arm control unit 101, a lighting control unit 102, and a control unit 103.

The arm control unit 101 controls the arm 140 in order to change the surface of the inspection subject 150 to be a capturing target of the time-correlation camera 110. In the first embodiment, a plurality of surfaces of the inspection subject 150 to be the capturing target is set in advance in the PC 100. According to this setting, for each time the time-correlation camera 110 finishes capturing the inspection subject 150, the arm control unit 101 moves the inspection subject 150 by using the arm 140, such that the time-correlation camera 110 can capture the surfaces. The first embodiment is not limited to repeating to move the arm 140 each time the capturing is finished and to stop the arm 140 before the capturing starts, and the arm 140 may be driven continuously. The arm 140 may also be referred to as a transport unit, a moving unit, a position change unit, a posture change unit, and the like.

The lighting control unit 102 is configured to be capable of outputting stripe patterns to be emitted by the lighting apparatus 120. In the first embodiment, it is assumed that the lighting control unit 102 delivers a plurality of (at least two or more) stripe patterns to the lighting apparatus 120, and instructs the lighting apparatus 120 to display the stripe patterns by switching during the exposure time.

Figure 9:
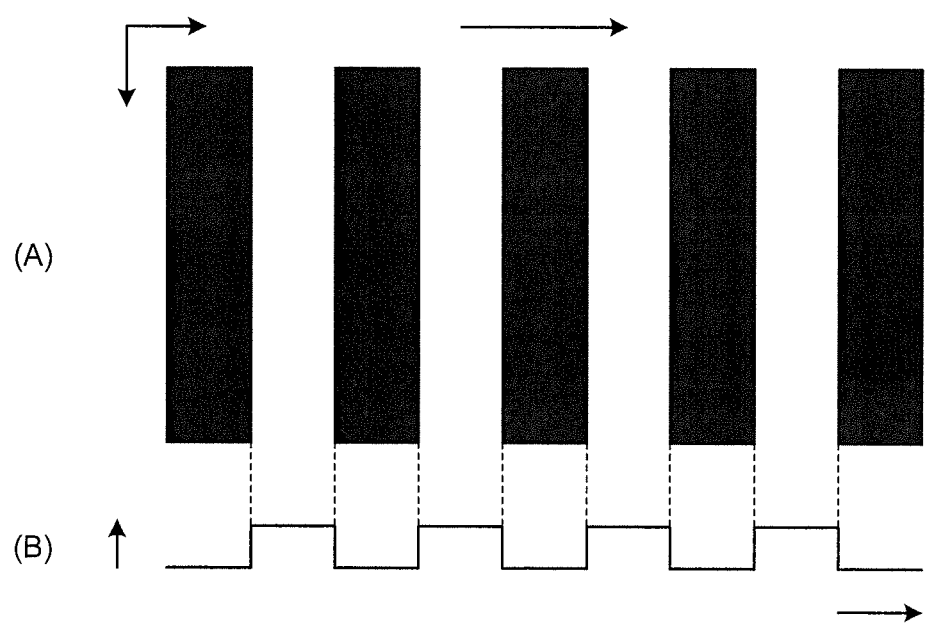
FIG. 9 is an exemplary diagram illustrating one example of a stripe pattern that a lighting control unit outputs to the lighting apparatus in the first embodiment.

FIG. 9 is a diagram illustrating an example of a stripe pattern that the lighting control unit 102 causes the lighting apparatus 120 to output. In the example illustrated in FIG. 9, the lighting control unit 102 controls the lighting apparatus 120 so as to output a stripe pattern in which black areas and white areas illustrated in (A) are set, in accordance with a rectangular wave illustrated in (B).

It is assumed that the intervals of the stripes in the stripe pattern used in the first embodiment are set depending on the size of an abnormality (defect) to be the object of detection, and the detailed description thereof is omitted.

In the first embodiment, it is assumed that the angular frequency ω of the square wave to output the stripe pattern has the same value as the angular frequency ω of the reference signal.

Figure 10:
FIG. 10 is an exemplary diagram illustrating one example of the shape of a wave representing the stripe pattern after passing through a screen in the first embodiment.

As illustrated in FIG. 9, the stripe pattern that the lighting control unit 102 outputs can be represented as the rectangular wave. However, in the first embodiment, by emitting the light corresponding to the stripe pattern via the screen 130, the boundary areas of the stripe pattern are blurred, that is, the changes in the intensity of the light at the boundary between the light area (stripe area) and the shade area (interval area) in the stripe pattern are made to be gentle (dull). That is, in the first embodiment, the intensity changes in the light corresponding to the stripe pattern after passing through the screen 130 is approximated by a sine wave. FIG. 10 is an exemplary diagram illustrating one example of the shape of a wave representing the stripe pattern after passing through the screen 130. Such a wave that is approximated by the sine wave illustrated in FIG. 10 brings about improvement in measurement accuracy (detection accuracy of abnormality). In the first embodiment, a gray area in which brightness changes in multiple stages may be added to the stripe, or gradation may be provided. Furthermore, in the first embodiment, a stripe pattern including colored stripes may be used.

Referring back to FIG. 1, the control unit 103 calculates, on the basis of the image data (intensity image data and time-correlation image data) received from the time-correlation camera 110, features that correspond to the distribution of normal vectors of an inspection target surface of the inspection subject 150 and are to detect an abnormality by the difference from the periphery, and then detects the abnormality of the inspection subject 150. It is assumed that the control unit 103 in the first embodiment receives from the time-correlation camera 110, in order to perform inspection, not the time-correlation image data itself expressed by a complex number (complex time-correlation image data) but two types of time-correlation image data corresponding to the real part and the imaginary part of the complex number. The control unit 103 includes an image generation unit 104 and an abnormality detection unit 105.

The image generation unit 104 generates an amplitude image and a phase image based on the intensity image data and the time-correlation image data received from the time-correlation camera 110. As in the foregoing, the amplitude image corresponds to the amplitude image data representing the amplitude of the entering light for each pixel, and the phase image corresponds to the phase image data representing the phase of the entering light for each pixel.

Although the first embodiment does not limit the calculation method of the amplitude image, the image generation unit 104 derives each pixel value F (x, y) of the amplitude image, by using Expression (8) from the two types of pixel values C1 (x, y) and C2 (x, y) of the time-correlation image, for example.

$$F(x,y) = \sqrt{C1(x,y)^2 + C2(x,y)^2} \tag{8}$$

The abnormality detection unit 105 determines, on the basis of the pixel value (amplitude) of the amplitude image and the pixel value (intensity) of the intensity image, whether there is an area where an abnormality is present. For example, in an area where the value obtained by dividing the pixel value (AT) of the intensity image by 2 and the amplitude of the amplitude image (will be AT/2 if no cancellation occurs) match to a certain extent, it can be presumed that the abnormality is not present. Meanwhile, in an area where the two do not match, it can be presumed that the cancellation of amplitude occurs.

Similarly, although the first embodiment does not limit the calculation method of the phase image, the image generation unit 104 derives each pixel value P (x, y) of the phase image, by using Expression (9) from the pixel values C1 (x, y) and C2 (x, y).

$$P(x, y) = \arctan\left(\frac{C2(x, y)}{C1(x, y)}\right) \tag{9}$$

The abnormality detection unit 105 calculates, on the basis of the above-described differences from the periphery in the amplitude image and the phase image, features that correspond to the distribution of normal vectors of the inspection target surface and are for detecting an abnormality of the inspection subject 150. In the first embodiment, an example in which the distribution of amplitude is used as a feature corresponding to the distribution of normal vectors will be described. The distribution of amplitude is data indicating the distribution of amplitude of each pixel on a complex time-correlation image and is equivalent to the amplitude image data.

Figure 11:
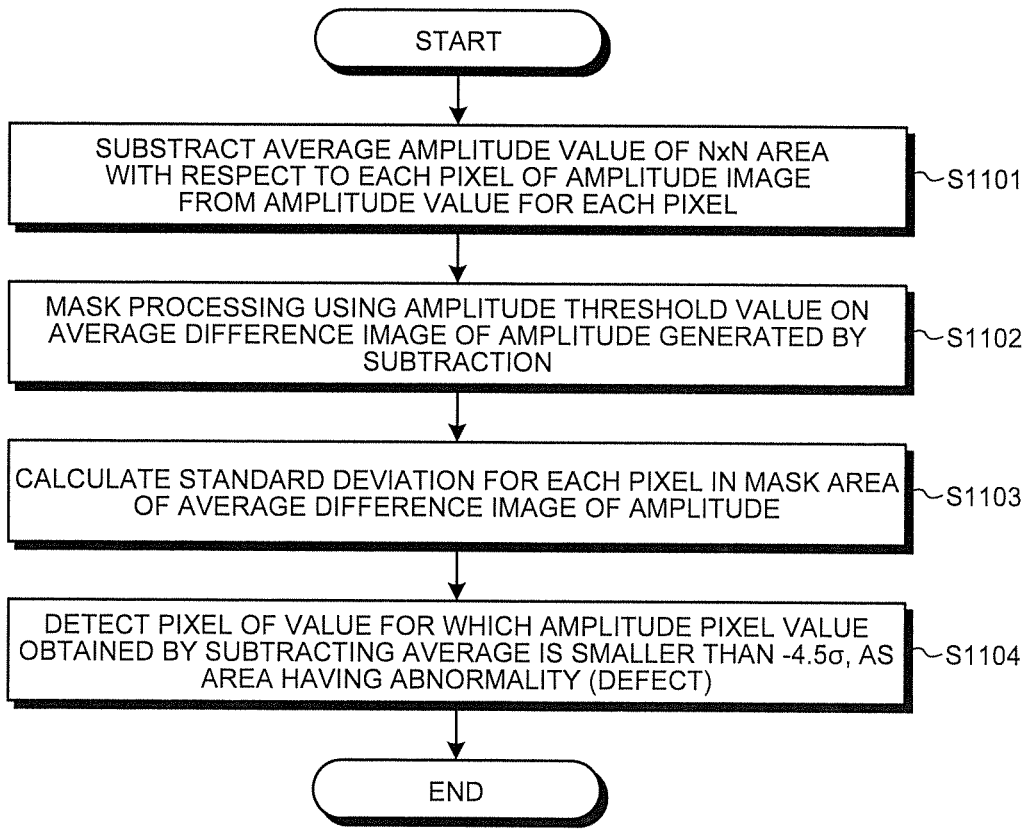
FIG. 11 is an exemplary flowchart illustrating one example of a procedure of abnormality detection processing based on amplitude that is performed by an abnormality detection unit in the first embodiment.

FIG. 11 is an exemplary flowchart illustrating one example of a procedure of abnormality detection processing based on the amplitude that is performed by the abnormality detection unit 105 in the first embodiment.

In the example illustrated in FIG. 11, the abnormality detection unit 105 first subtracts an average amplitude value of an N×N area with respect to (for example, centering on) each pixel of the amplitude image from (a pixel value representing) an amplitude value of light stored in each pixel of the amplitude image (S1101), and then generates an average difference image of the amplitude. The average difference image of the amplitude corresponds to the gradient of the amplitude. The integer N may be set to an appropriate value according to an aspect of the embodiment.

Then, the abnormality detection unit 105 performs, on the average difference image of the amplitude generated by the subtraction, mask processing using a threshold value of predetermined amplitude (S1102).

Furthermore, the abnormality detection unit 105 calculates a standard deviation for each pixel in the mask area of the average difference image (S1103). In the embodiment, a method based on the standard deviation will be described. However, the first embodiment is not limited to the case where the standard deviation is used, and an average value may be used, for example.

Then, the abnormality detection unit 105 detects, as an area having an abnormality (defect), a pixel of a value for which the amplitude pixel value obtained by subtracting the average is smaller than −4.5σ (σ: standard deviation) (S1104).

By the above-described processing procedure, the abnormality of the inspection subject can be detected from the amplitude value of each pixel (in other words, the distribution of the amplitude). However, the first embodiment is not limited to detecting an abnormality from the distribution of the amplitude of the complex time-correlation image. As the features corresponding to the distribution of normal vectors of the inspection target surface, the gradient of the distribution of the phase can also be used. Thus, abnormality detection processing using the gradient of the distribution of the phase will be described next.

Figure 12:
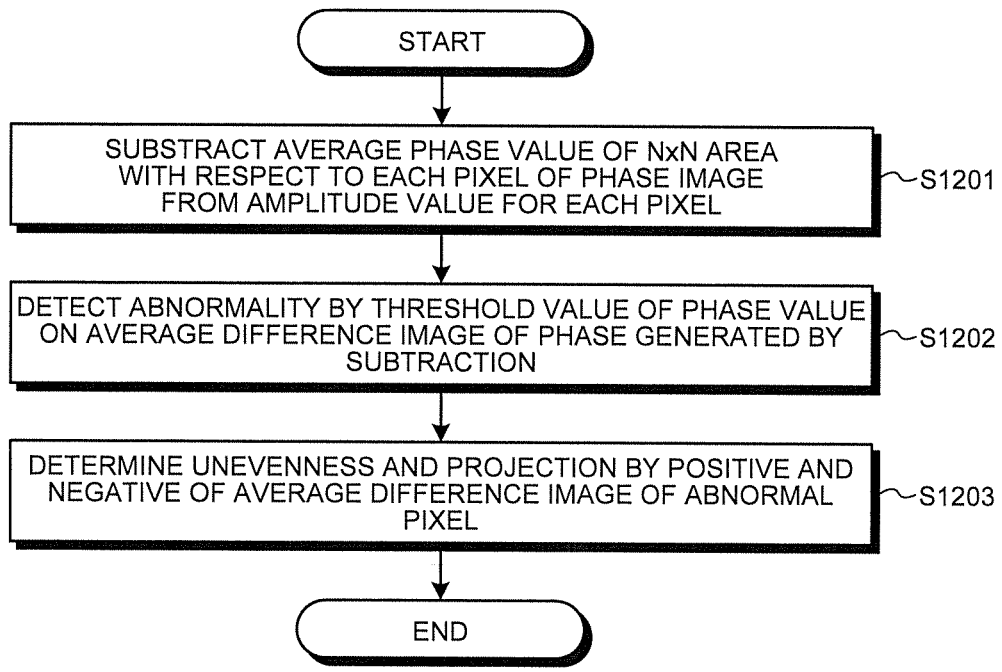
FIG. 12 is an exemplary flowchart illustrating one example of a procedure of the abnormality detection processing based on phase that is performed by the abnormality detection unit in the first embodiment.

FIG. 12 is an exemplary flowchart illustrating one example of a procedure of the abnormality detection processing based on the phase that is performed by the abnormality detection unit 105 in the first embodiment.

In the example illustrated in FIG. 12, the abnormality detection unit 105 first subtracts an average phase value of an N×N area with respect to (for example, centering on) each pixel of the phase image from (a pixel value representing) a phase value of light for each pixel of the phase image, (S1201), and then generates an average difference image of the phase. The average difference image of the phase corresponds to the gradient of the phase.

Then, the abnormality detection unit 105 compares the magnitude (absolute value) of the pixel value of the average difference image of the phase generated by the subtraction with a threshold value, and detects, as a pixel having an abnormality (defect), a pixel for which the magnitude of the pixel value of the average difference image is greater than or equal to the threshold value (S1202).

By the detection result of this S1202, the abnormality detection unit 105 can determine an unevenness by the positive and negative of the average difference image, that is, the magnitude relationship between the phase value of the pixel and the average phase value (S1203). Although the fact that a projection is formed when either the phase value of the pixel or the average phase value is greater is changed depending on the setting of each unit, if the magnitude relationship is different, the unevenness is different.

In the first embodiment, an abnormality can be detected from the gradient of the distribution of the phase obtained by other methods. For example, as another method, the abnormality detection unit 105 can use a method of detecting as a pixel having an abnormality (defect) when the magnitude of the difference between the normalized average vector of the N×N area of the time-correlation image and the normalized vector of each pixel is greater than a threshold value. The method of abnormality detection processing based on the phase is not limited to the method using the gradient of the distribution of the phase, and may be a method using information corresponding to the distribution of the phase.

Figure 13:
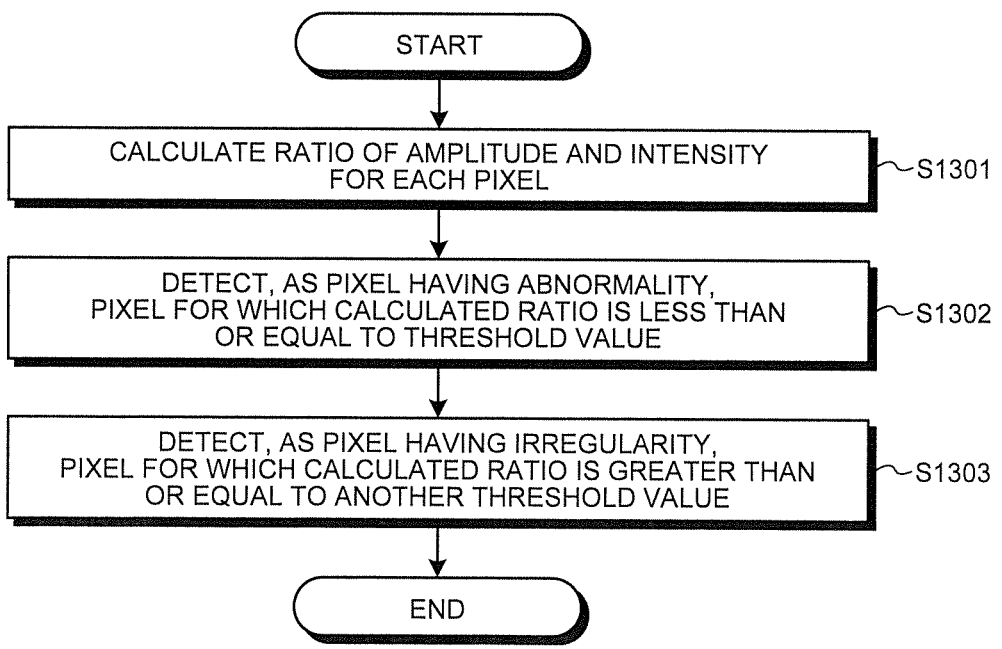
FIG. 13 is an exemplary flowchart illustrating one example of a procedure of the abnormality detection processing based on amplitude and intensity that is performed by the abnormality detection unit in the first embodiment.

In the first embodiment, both the amplitude and the intensity may be considered in the abnormality detection processing. FIG. 13 is an exemplary flowchart illustrating one example of a procedure of the abnormality detection processing based on the amplitude and the intensity that is performed by the abnormality detection unit 105 in the first embodiment.

In the example illustrated in FIG. 13, the abnormality detection unit 105 first calculates, from the time-correlation image and the intensity image, a ratio R (x, y) of the amplitude (a pixel value representing it) C (x, y) (see Expression 7) and the intensity (a pixel value representing it) G (x, y) (see Expression 6) for each pixel by using the following Expression (100) (S1301).

$$R(x,y)=C(x,y)/G(x,y) \quad (100)$$

Then, the abnormality detection unit 105 compares the ratio R (x, y) with a threshold value, and detects, as a pixel having an abnormality (defect), a pixel for which the value of the ratio R (x, y) is less than or equal to the threshold value corresponding thereto (S1302). Furthermore, the abnormality detection unit 105 compares the ratio R (x, y) with a threshold value, and detects, as a pixel having an irregularity (such as dirt), a pixel for which the value of the ratio R (x, y) is greater than or equal to another threshold value corresponding thereto (S1303). When the cancellation (lessening) of amplitude is noticeable due to the abnormality of the distribution of normal vectors, the amplitude greatly drops as compared with the intensity. Meanwhile, when the absorption of light due to the dirt and the like on the surface of the inspection subject 150 is noticeable while the abnormality is not much in the distribution of normal vectors, the intensity greatly drops as compared with the amplitude. Accordingly, the abnormality detection unit 105 is able to detect the abnormality type by S1302 and S1303.

As in the foregoing, if the stripe pattern is moved in a predetermined direction (assumed to be the x direction), an abnormality that produces changes in the distribution of normal vectors in the x direction, for example, a flaw (defect) extending in the direction intersecting (orthogonal) with the x direction (assumed to be the y direction), can be easily detected. However, it is conceivable that the detection of a flaw (defect) that extends in the x direction, that is, an abnormality that produces changes in the distribution of normal vectors along the y direction, is facilitated when moving the stripe pattern in the y direction rather than moving the stripe pattern in the x direction.

Figure 14:
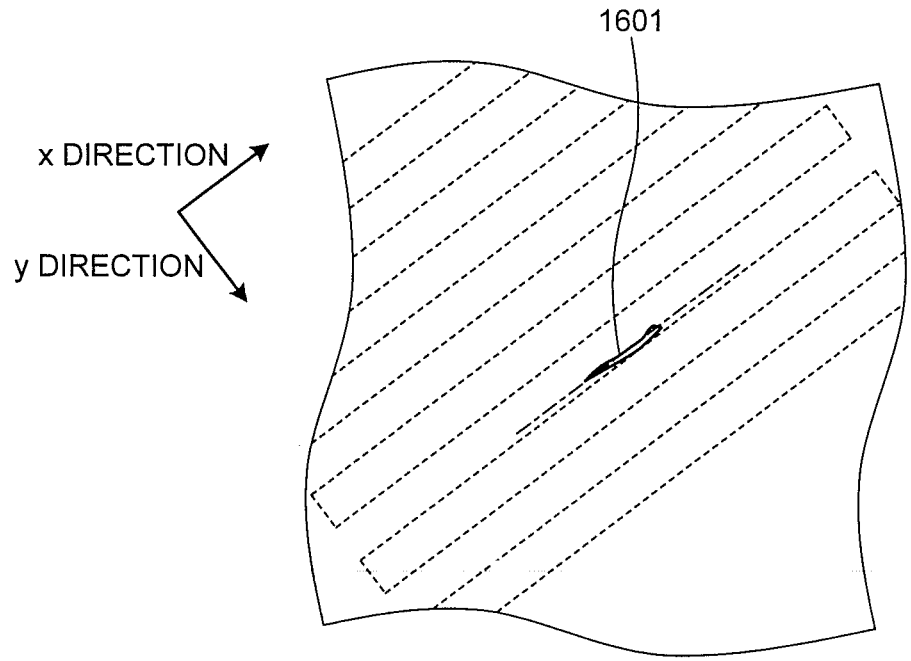
FIG. 14 is an exemplary diagram illustrating a state in which the lighting apparatus emits a stripe pattern lying along the direction in which an abnormality (defect) extends, in the first embodiment.

FIG. 14 is an exemplary diagram illustrating a state in which the lighting apparatus 120 emits a stripe pattern lying along the direction in which an abnormality (defect) extends, in the first embodiment. In the example illustrated in FIG. 14, an abnormality (defect) 1601 extending in the x direction is present. For aforementioned reason, it is conceivable that the abnormality 1601 extending in the x direction can be easily detected if a stripe pattern extending along the x direction as with the abnormality 1601 is moved along the y direction.

Figure 15:
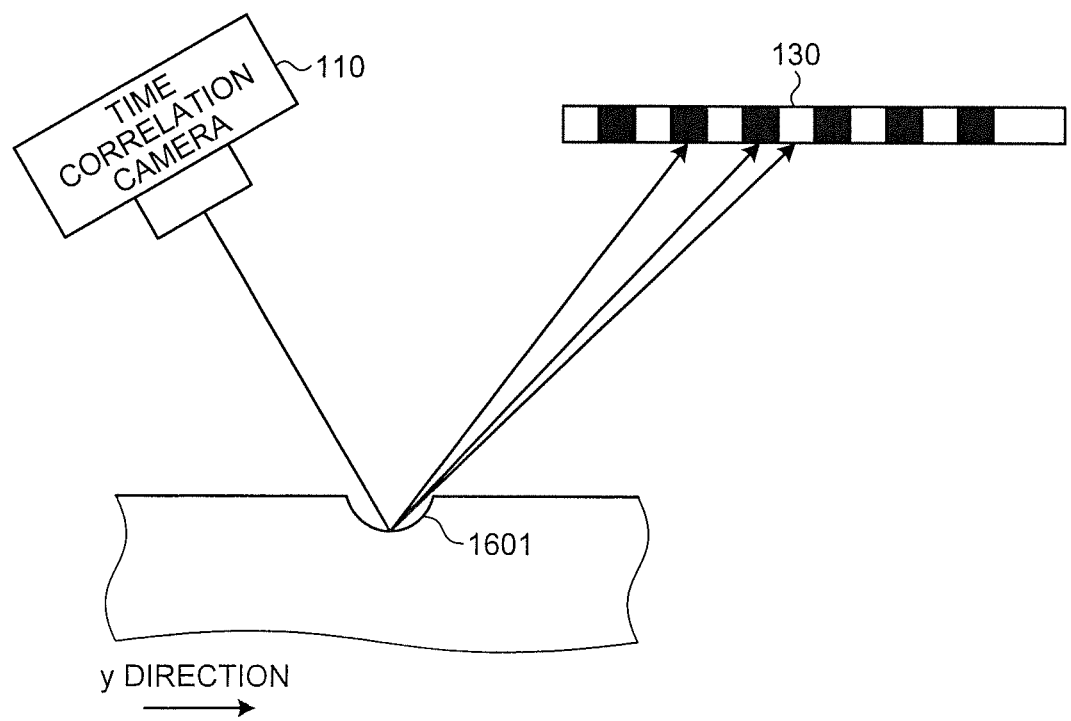
FIG. 15 is an exemplary diagram illustrating a relationship between an abnormality (defect) and a stripe pattern when the stripe pattern in FIG. 14 is changed (moved) along a y direction, in the first embodiment.

FIG. 15 is an exemplary diagram illustrating a relationship between an abnormality (defect) and a stripe pattern when the stripe pattern in FIG. 14 is changed (moved) along the y direction, in the first embodiment. As illustrated in FIG. 15, when the abnormality (defect) 1601 for which the width in the y direction is narrow and the longitudinal direction of which is the x direction intersecting (orthogonal) with the y direction is present, the cancellation of the amplitude of the light emitted from the lighting apparatus 120 is increased in the y direction orthogonal to the x direction. Thus, it can be found that, in order to easily detect the abnormality 1601 that extends in the x direction, an inspection using an amplitude image acquired by moving in the y direction the stripe pattern extending in the x direction is only performed.

As just described, in order to accurately detect an abnormality (flaw, defect) that can have various directivity, it needs to perform an inspection by use of a plurality of time-correlation images obtained by moving, in different directions (at least two directions), a plurality of types of stripe patterns extending in different directions (at least two types of stripe patterns extending in two directions intersecting with each other).

Conventionally, in order to obtain the time-correlation image corresponding to each of the two types of stripe patterns extending in directions intersecting with each other, after correlation calculation (frame superimposition) is performed by continuously outputting one of the stripe patterns and the output of the one of the stripe patterns is then temporarily stopped, and thereafter, the other of the stripe patterns is newly read and the correlation calculation is then performed by continuously outputting only the other of the stripe patterns. Thus, conventionally, it has taken time for switching the stripe patterns, and the takt time (cycle time) needed for the inspection has increased.

Consequently, in order to satisfy both of accurately detecting an abnormality (flaw, defect) that has directivity and shortening the takt time (cycle time) needed for the inspection, the lighting apparatus 120 of the first embodiment switches in a seamless manner two types of stripe patterns extending in two directions (defined as a first direction and a second direction) intersecting with each other. More specifically, the lighting apparatus 120 continuously outputs a plurality of stripe patterns by sequentially switching at predetermined time intervals so that, after moving a first stripe pattern extending in the first direction to the second direction intersecting with the first direction for one period, a second stripe pattern extending in the second direction moves to the first direction for one period. In the following description, by using the x direction and the y direction orthogonal to each other, the first direction is described as the y direction and the second direction is described as the x direction.

Figure 16:
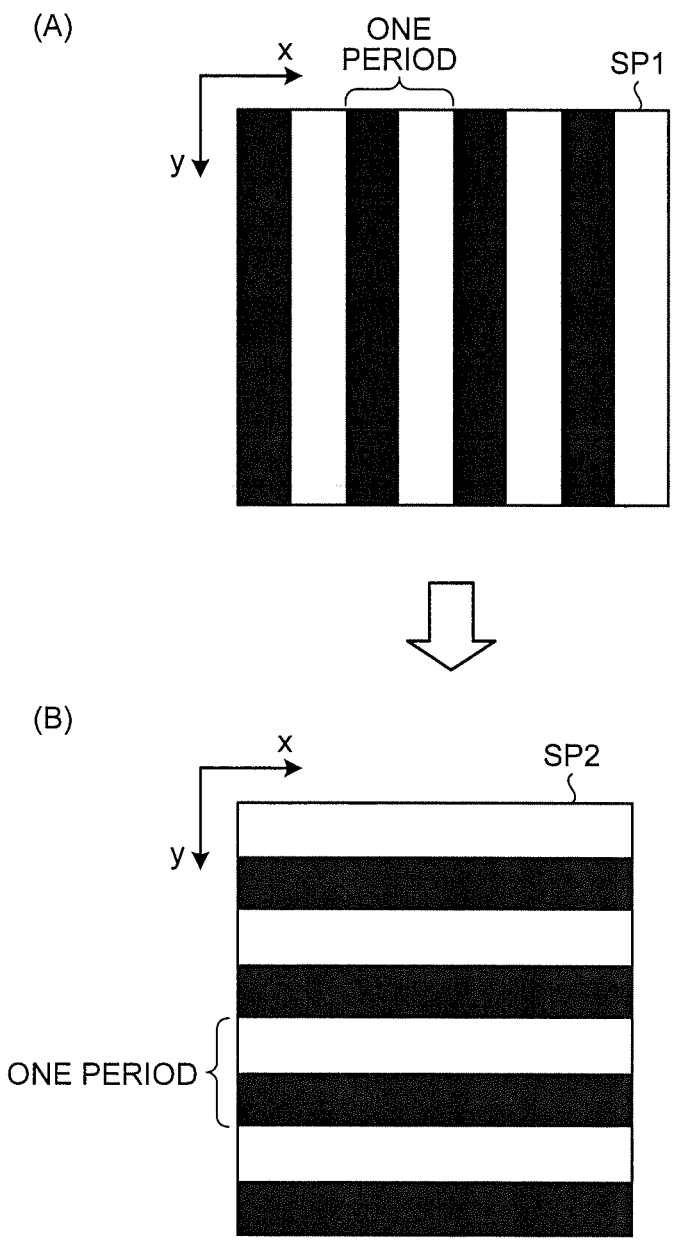
FIG. 16 is an exemplary diagram illustrating one example of switching stripe patterns performed by the lighting apparatus in the first embodiment.

FIG. 16 is an exemplary diagram illustrating one example of switching stripe patterns performed by the lighting apparatus 120 in the first embodiment. As illustrated in FIG. 16, the lighting apparatus 120 of the first embodiment performs seamless switching of the stripe patterns after moving a first stripe pattern SP1 extending in the y direction as illustrated in (A) to the x direction for one period, and then moves a second stripe pattern SP2 extending in the x direction as illustrated in (B) to the y direction for one period. In the following description, for the sake of simplicity, it will be described that the first stripe pattern SP1 and the second stripe pattern SP2 are different only in directions but are the same in the other conditions such as a stripe width and intervals between adjacent stripes. However, in the first embodiment, not only the directions but also the stripe width and the intervals between adjacent stripes may be different between the first stripe pattern SP1 and the second stripe pattern SP2.

Incidentally, when the switching of two types of the above-described stripe patterns is performed in a seamless manner, the operation of the lighting apparatus 120 and the operation of the time-correlation camera 110 need to be synchronized more accurately. For example, in the example illustrated in FIG. 16, unless the start timing of outputting the first stripe pattern SP1 and the start timing of the superimposition of frames by the time-correlation camera 110 are made to coincide and also unless the switching timing from the first stripe pattern SP1 to the second stripe pattern SP2 and the end timing of the superimposition of frames by the time-correlation camera 110 are made to coincide, it is not possible to obtain a time-correlation image corresponding to the first stripe pattern SP1 alone excluding the influence of the second stripe pattern SP2. Similarly, in the example illustrated in FIG. 16, unless the switching timing from the first stripe pattern SP1 to the second stripe pattern SP2 and the start timing of the superimposition of frames by the time-correlation camera 110 are made to coincide and also unless the end timing of outputting the second stripe pattern SP2 and the end timing of the superimposition of frames by the time-correlation camera 110 are made to coincide, it is not possible to obtain a time-correlation image corresponding to the second stripe pattern SP2 alone excluding the influence of the first stripe pattern SP1.

Thus, referring back to FIG. 2, the time-correlation camera 110 of the first embodiment has configuration for more accurately synchronizing the operation of the lighting apparatus 120 and the operation of the time-correlation camera 110. More specifically, in the time-correlation camera 110 of the first embodiment, the first signal output unit 251 configured to output to the lighting apparatus 120 a first signal serving as a trigger to start outputting the patterns and a second signal output unit 252 configured to output to the lighting apparatus 120 a second signal serving as a trigger to switch the stripe patterns are provided.

As illustrated in FIG. 2, the first signal is output not only to the lighting apparatus 120 but also to the reading unit 242 and the reference-signal output unit 260. Thus, the reading unit 242 starts reading the frame output from the image sensor 220 at the timing based on the first signal, and the reference-signal output unit 260 starts outputting the reference signal at the timing based on the first signal. As a result, the correlation-image superimposer 244 starts the superimposition of the frames output from the image sensor 220 at the timing based on the first signal to acquire the time-correlation image data obtained by capturing an image of the inspection target surface of the inspection subject 150 that is illuminated by the lighting apparatus 120.

Figure 17:
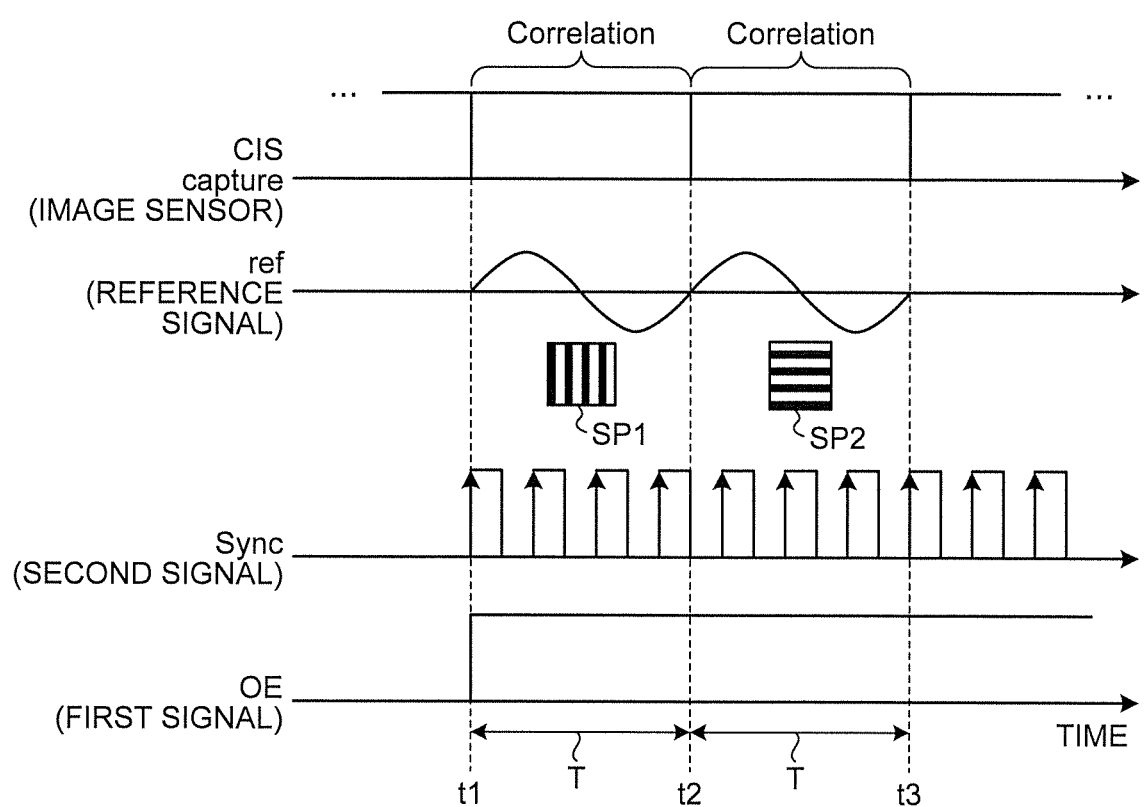
FIG. 17 is an exemplary timing chart illustrating one example of operation timings of the time-correlation camera and the lighting apparatus in the first embodiment.

FIG. 17 is an exemplary timing chart illustrating one example of operation timings of the time-correlation camera 110 and the lighting apparatus 120 in the first embodiment. In FIG. 17, "CIS capture" represents a situation in which the frames output from the image sensor 220 are stored, "ref" represents the reference signal output from the reference-signal output unit 260, and "Correlation" indicates the period during which the correlation calculation (frame superimposition) is performed. Furthermore, in FIG. 17, "Sync" represents the second signal output from the second signal output unit 252, and "OE" represents the first signal output from the first signal output unit 251. In the example illustrated in FIG. 17, it is assumed that the lighting apparatus 120 performs seamless switching of the first stripe pattern SP1 and the second stripe pattern SP2 the same as those of FIG. 16.

In the example illustrated in FIG. 17, at timing t1, outputting of the first signal and the second signal starts. Accordingly, the lighting apparatus 120 starts outputting a plurality of stripe patterns at the timing t1 based on the first signal, and sequentially switches the stripe patterns on the basis of the second signal. That is, the lighting apparatus 120 starts moving the first stripe pattern SP1 for one period at the timing t1. Then, at timing t2 at which the moving of the first stripe pattern SP1 ends, the lighting apparatus 120 performs switching to the second stripe pattern SP2 in a seamless manner and starts moving the second stripe pattern SP2 for one period. The moving of the second stripe pattern SP2 for one period ends at timing t3.

The time needed for the first stripe pattern SP1 to move for one period and the time needed for the second stripe pattern SP2 to move for one period are set to coincide with each other. Therefore, in the example illustrated in FIG. 17, the time between the timing t1 and the timing t2 and the time between the timing t2 and the timing t3 are of equal magnitude (represented by a symbol T).

Meanwhile, when outputting of the first signal is started at the timing t1, in response to that, the reading unit 242 starts reading the frame and the reference-signal output unit 260 starts outputting the reference signal. In the example illustrated in FIG. 17, as the reference signal, a sine wave of a period T is used. Accordingly, in the example illustrated in FIG. 17, the value of the reference signal changes for two periods before ending the movement of the second stripe pattern SP2 after starting the movement of the first stripe pattern SP1. In the following description, for the sake of convenience of explanation, the first half portion of the reference signal, that is, the portion for which the value changes along with the time transition in moving the first stripe pattern SP1 for one period may be described as a first section, and the second half portion of the reference signal, that is, the portion for which the value changes along with the time transition in moving the second stripe pattern SP2 for one period may be described as a second section.

In the example illustrated in FIG. 17, the reference signal is of a single system, and the waveforms of the reference signal of the single system are identical in the first half portion (first section) and the second half portion (second section). Thus, unlike the case where the waveforms are different between the first section and the second section, it is possible to simplify the processing of the reference-signal output unit 260.

On the basis of the above-described reference signal, the correlation-image superimposer 244 is able to separately acquire first time-correlation image data based on the influence of the first stripe pattern SP1 alone and second time-correlation image data based on the influence of the second stripe pattern SP2 alone, without acquiring the time-correlation image data in which the influences of both the first stripe pattern SP1 and the second stripe pattern SP2 are mixed. That is, by performing the correlation calculation (frame superimposition) twice before ending the movement of the second stripe pattern SP2 after starting the movement of the first stripe pattern SP1, the correlation-image superimposer 244 can acquire the first time-correlation image data that is the superimposition result of frames before switching the first stripe pattern SP1 to the second stripe pattern SP2, and acquire the second time-correlation image data that is the superimposition result of frames after having switched to the second stripe pattern SP2 from the first stripe pattern SP1.

More specifically, from the timing t1 to the timing t2, the correlation-image superimposer 244 superposes the frames while multiplying the value of the reference signal (first section), so that the first time-correlation image data based on the influence of the first stripe pattern SP1 alone is acquired. Then, from the timing t2 to the timing t3, the correlation-image superimposer 244 superposes the frames while multiplying the value of the reference signal (second section), so that the second time-correlation image data based on the influence of the second stripe pattern SP2 alone is acquired.

Referring back to FIG. 1, the image generation unit 104 forms images based on the above-described first time-correlation image data and the second time-correlation image data received from the time-correlation camera 110, and then generates the first time-correlation image corresponding to the first stripe pattern SP1 alone and the second time-correlation image corresponding to the second stripe pattern SP2 alone. Then, the abnormality detection unit 105 performs the abnormality detection processing by using the generated first time-correlation image and the second time-correlation image.

Figure 18:
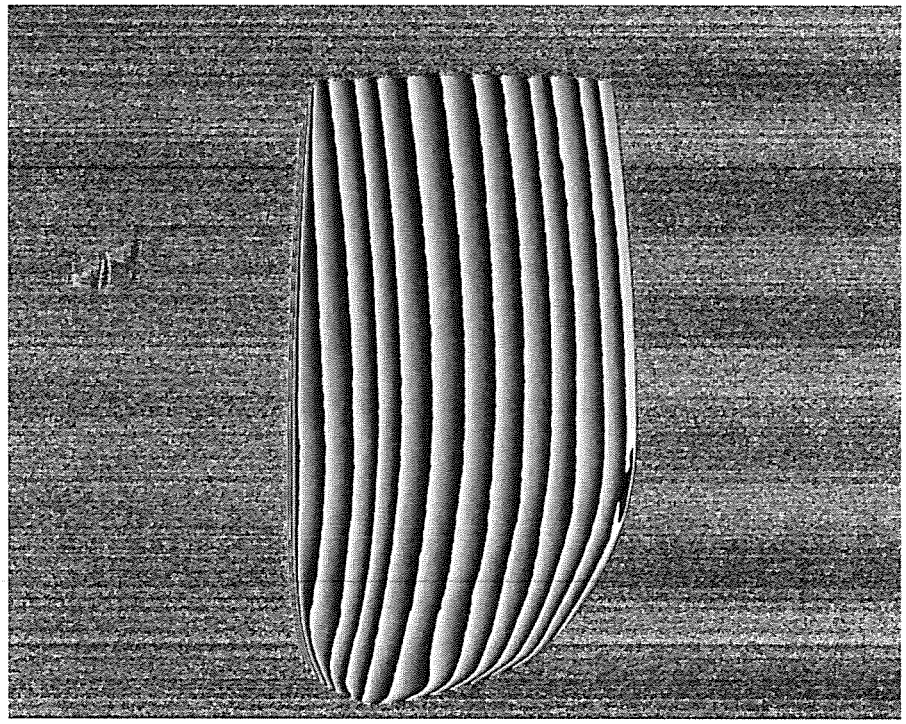
FIG. 18 is an exemplary diagram illustrating a specific example of a first time-correlation image generated in the first embodiment.
Figure 19:
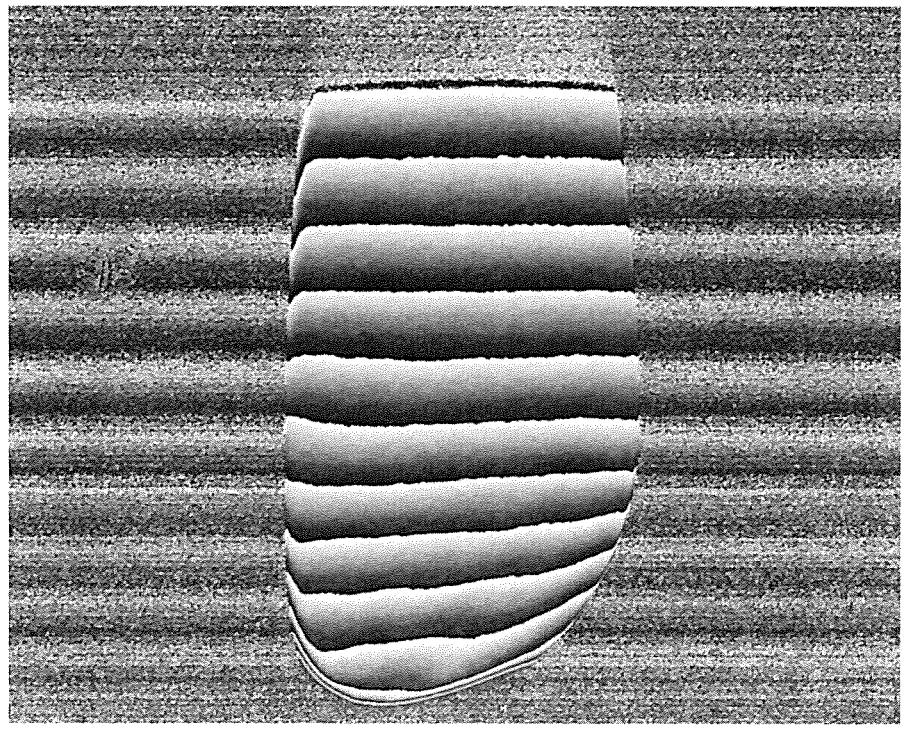
FIG. 19 is an exemplary diagram illustrating a specific example of a second time-correlation image generated together with the first time-correlation image in FIG. 18 in the first embodiment.

FIG. 18 is an exemplary diagram illustrating a specific example of the first time-correlation image generated in the first embodiment, and FIG. 19 is an exemplary diagram illustrating a specific example of the second time-correlation image generated together with the first time-correlation image of FIG. 18 in the first embodiment. As illustrated in FIG. 18 and FIG. 19, in the first embodiment, because the time-correlation camera 110 and the lighting apparatus 120 are synchronized by using the above-described first signal and the second signal, it is possible to obtain not the time-correlation image in which both influences of two types of stripe patterns extending in the different directions are mixed but two time-correlation images corresponding to the two types of respective stripe patterns.

Figure 20:
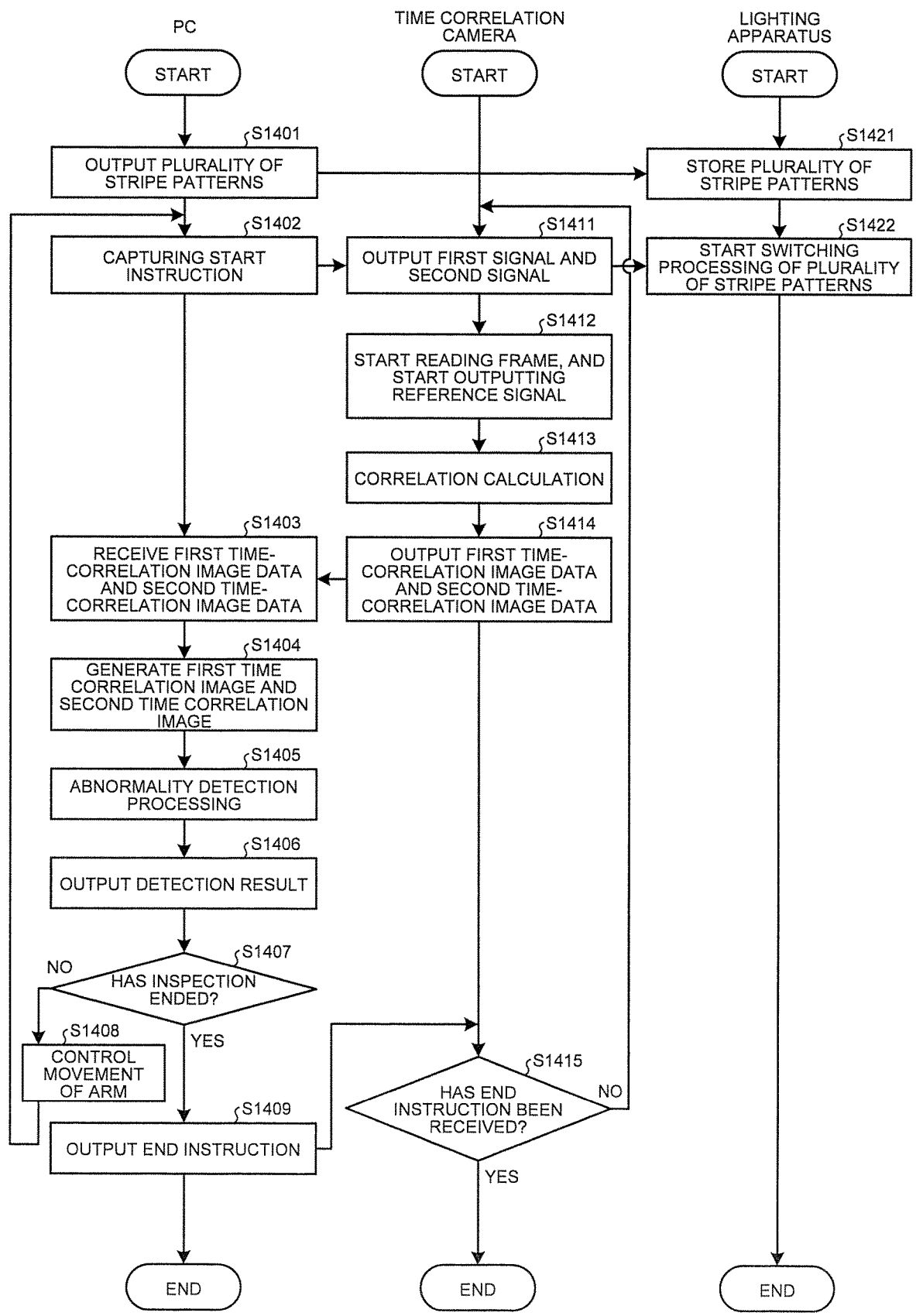
FIG. 20 is an exemplary flowchart illustrating one example of a procedure of inspection processing on the inspection subject performed by the inspection system in the first embodiment.

Next, the inspection processing on the inspection subject 150 in the first embodiment will be described. FIG. 20 is an exemplary flowchart illustrating one example of a procedure of the inspection processing performed by the inspection system in the first embodiment. It is assumed that the inspection subject 150 is arranged at an initial position of the inspection in a state of being fixed to the arm 140 already.

In the first embodiment, first, at S1401, the PC 100 outputs, to the lighting apparatus 120, a plurality of stripe patterns used for the inspection on the inspection subject 150. The output stripe patterns referred herein are the stripe patterns that can implement the moving of the first stripe pattern SP1 for one period and the moving of the second stripe pattern SP2 for one period.

Then, at S1421, the lighting apparatus 120 stores the stripe patterns input from the PC 100.

Then, at S1402, the PC 100 outputs, to the time-correlation camera 110, an capturing start instruction.

When the capturing start instruction is input from the PC 100, at S1411, the time-correlation camera 110 starts outputting the first signal and the second signal. The first signal and the second signal are output to the lighting apparatus 120.

When the first signal and the second signal are input from the time-correlation camera 110, at S1422, the lighting apparatus 120 starts processing of sequentially switching the stripe patterns stored at S1421 at predetermined time intervals. Accordingly, the lighting apparatus 120 seamlessly switches, after moving the first stripe pattern SP1 for one period, the first stripe pattern SP1 to the second stripe pattern SP2 and moves the second stripe pattern SP2 for one period. The lighting apparatus 120 may, after ending the moving of the second stripe pattern SP2 for one period, start the moving for one period in order of the first stripe pattern SP1 and the second stripe pattern SP2 again, or may end the outputting of the stripe patterns.

The first signal at S1411 is output not only to the lighting apparatus 120 but also to the reading unit 242 and the reference-signal output unit 260 of the time-correlation camera 110. Thus, at S1412, at the timing based on the first signal, the reading unit 242 starts reading the frame output from the image sensor 220, and the reference-signal output unit 260 starts outputting the reference signal to the correlation-image superimposer 244 of the time-correlation camera 110. As a result, at S1413, the correlation-image superimposer 244 performs the correlation calculation (frame superimposition) twice from starting the movement of the first stripe pattern SP1 to ending the movement of the second stripe pattern SP2, and acquires the first time-correlation image data that is the superimposition result of frames before switching the first stripe pattern SP1 to the second stripe pattern SP2 and the second time-correlation image data that is the superimposition result of frames after having switched to the second stripe pattern SP2 from the first stripe pattern SP1.

Then, at S1414, the time-correlation camera 110 outputs, to the PC 100, the first time-correlation image data and the second time-correlation image data generated at S1413. At this time, the time-correlation camera 110 may also output, to the PC 100, the intensity image data acquired by the intensity-image superimposer 243, in addition to the first time-correlation image data and the second time-correlation image data.

Then, at S1403, the PC 100 receives from the time-correlation camera 110 the first time-correlation image data and the second time-correlation image data (in addition, the intensity image data) output at S1414. Then, at S1404, the image generation unit 104 of the control unit 103 of the PC 100 generates, based on the data received at S1403, a first time-correlation image corresponding to the first stripe pattern SP1 alone and a second time-correlation image corresponding to the second stripe pattern SP2 alone.

Then, at S1405, the abnormality detection unit 105 of the control unit 103 of the PC 100 performs the abnormality detection processing on the inspection subject 150, on the basis of the first time-correlation image and the second time-correlation image. As for the procedure of the abnormality detection processing, several examples have already been described (for example, see FIG. 11 to FIG. 13), and thus the description thereof is omitted.

Then, at S1406, the abnormality detection unit 105 outputs the result of the abnormality detection processing at S1405 to an output device such as a display included in the PC 100 (or coupled to the PC 100).

As for the method of outputting the result of the abnormality detection processing, it is conceivable to highlight (decorate), after displaying an intensity image, the area corresponding to the abnormality in the intensity image, for example. The result of the abnormality detection processing, in lieu of outputting it in style of appealing to vision, may be output in style of appealing to hearing by using sound, or may be output in a combination of the style of appealing to vision and the style of appealing to hearing.

When outputting the result of the abnormality detection processing at S1406 ends, at S1407, the control unit 103 determines whether the inspection on the inspection subject 150 has ended.

At S1407, if determined that the inspection has not ended, the processing proceeds to S1408. Then, at S1408, the arm control unit 101 of the PC 100 controls movement of the arm 140 in accordance with the predetermined setting so that the time-correlation camera 110 can capture an image of the surface to be the next inspection target in the inspection subject 150. When the control of the movement of the arm 140 is finished, the processing returns to S1402 and the PC 100 then outputs the capturing start instruction to the time-correlation camera 110 again.

At S1407, if determined that the inspection has ended, the processing proceeds to S1409. Then, at S1409, the PC 100 outputs an end instruction that directs ending the inspection to the time-correlation camera 110. When the processing at S1409 ends, a series of processing performed by the PC 100 ends.

The time-correlation camera 110 determines, at S1415, whether the end instruction is received from the PC 100. At S1415, if determined that the end instruction is not received, the processing returns to S1411. However, at S1415, if determined that the end instruction is received, the processing ends as is, that is, a series of processing performed by the time-correlation camera 110 ends.

The end of the operation of the lighting apparatus 120 may be carried out by a manual operation of an inspector, or may be carried out by an instruction from the other configurations such as the PC 100 and the time-correlation camera 110.

In the above-described first embodiment, an example of acquiring the time-correlation image data (and the intensity image data) by using the time-correlation camera 110 that operates in digital manner has been described. However, the time-correlation image data can be acquired not only by the time-correlation camera 110 that operates in digital manner but also by a time-correlation camera that operates in an analog manner and an capturing system that performs an operation equivalent to the time-correlation camera. Other methods of acquiring the time-correlation image data includes a method in which, after acquiring normal image data by using a normal digital still camera, the reference signal is superposed by using an information processing device by assuming the normal image data as the frame image data, or a method in which an image sensor itself of a digital camera is provided with a function of superposing the reference signal, and the like are conceivable, for example.

As in the foregoing, in the first embodiment, the first signal output unit 251 that outputs to the lighting apparatus 120 the first signal serving as a trigger to start outputting the stripe patterns and the second signal output unit 252 that outputs to the lighting apparatus 120 the second signal serving as a trigger to switch the stripe patterns are provided. As a result, because the operation of the time-correlation camera 110 and the operation of the lighting apparatus 120 can be synchronized more accurately on the basis of the first signal and the second signal, it is possible to obtain easily or quickly the time-correlation images corresponding to two types of respective stripe patterns extending in the directions intersecting with each other.

For example, as in the foregoing, conventionally, in order to obtain the time-correlation image corresponding to each of the two types of stripe patterns extending in directions intersecting with each other, there has been a need in which correlation calculation (frame superimposition) is performed by continuously outputting one of the stripe patterns and the output of the one of the stripe patterns is then stopped temporarily, and thereafter, the other of the stripe patterns is newly read and the correlation calculation is then performed by continuously outputting only the other of the stripe patterns. Meanwhile, in the first embodiment, it is possible to easily obtain the time-correlation images corresponding to two types of stripe patterns by seamlessly switching the two types of stripe patterns extending in the directions intersecting with each other while matching the timing of output start/end of and switching of the stripe patterns with the timing of start/end and the correlation calculation (frame superimposition). Thus, in the first embodiment, because it does not take time to switch the stripe patterns as in the conventional case, it is possible to shorten the takt time (cycle time) needed for the inspection.

First Modification

In the above-described first embodiment, an example in which the feature for detecting an abnormality is calculated on the basis of the difference from the periphery has been described, but the feature for detecting the abnormality can also be calculated on the basis of the points other than the difference from the periphery. For example, as a first modification, it is conceivable to calculate the feature for detecting an abnormality on the basis of the difference from reference data representing a reference shape. In this case, the environment in which the inspection is performed actually needs to be matched with the environment in which the reference data has been acquired. For example, the positioning and synchronization of spatial-phase modulated illumination (stripe patterns) are needed.

In the first modification, the abnormality detection unit 105 compares reference data (time-correlation image data acquired from a reference surface) stored in a storage unit (not illustrated) in advance with the time-correlation image data of the inspection subject 150 that is the inspection subject of the current inspection, and between these two types of data, determines whether there is a difference greater than or equal to a predetermined reference in any one or more of the amplitude of light and the phase of light.

As the reference surface, the surface of a normal inspection subject is used, for example. That is, in the first modification, the time-correlation image data obtained by capturing an image of the surface of a normal inspection subject by the inspection system (the time-correlation camera 110) configured the same as that of the first embodiment is used as the reference data.

The specific inspection procedure according to the first modification is as follows. First, the time-correlation camera 110 acquires the time-correlation image data by capturing an image of the surface of a normal inspection subject while emitting the stripe patterns by the lighting apparatus 120 via the screen 130. The PC 100 then generates an amplitude image, a phase image, and the like on the basis of the time-correlation image data generated by the time-correlation camera 110, and stores the generated images. Then, the time-correlation camera 110 captures an image of the inspection target that is desired to determine whether an abnormality is present, and generates the time-correlation image data of the inspection target. The PC 100 then generates an amplitude image, a phase image, and the like from the time-correlation image data, and compares the generated images with the images of the normal inspection subject stored in advance in the storage unit. Then, the PC 100 calculates a feature for detecting an abnormality on the basis of the comparison result and determines whether there is an abnormality in the inspection target on the basis of whether the feature is greater than or equal to the predetermined reference.

As just described, in the first modification, it is determined whether an abnormality is present on the surface of the inspection target by determining whether a predetermined difference is present on the basis of the surface of a normal inspection subject as a reference. As the method of comparing various images such as the amplitude image and the phase image, any method may be used, and thus the description thereof is omitted.

In the first modification, as in the foregoing, an example in which the feature for detecting an abnormality is calculated based on the difference from the reference surface (difference from the reference data representing the reference shape) has been described, but the feature may be calculated in consideration of the reference other than the difference from the reference surface. For example, the feature for detecting an abnormality may be calculated by combining the difference from the reference surface used in the first modification and the difference from the periphery used in the above-described first embodiment. As the method of combining those, any method may be used, and thus the description thereof is omitted.

Second Embodiment

Next, the following describes a second embodiment. Unlike the first embodiment that acquires the time-correlation image data corresponding to the respective first stripe pattern SP1 and the second stripe pattern SP2 alone by performing correlation calculation (frame superimposition) separating the reference signal of one system into the first half portion and the second half portion, the second embodiment acquires the time-correlation image data corresponding to the respective first stripe pattern SP1 and the second stripe pattern SP2 alone by performing the correlation calculation separately on each of the reference signals of two systems.

Figure 21:
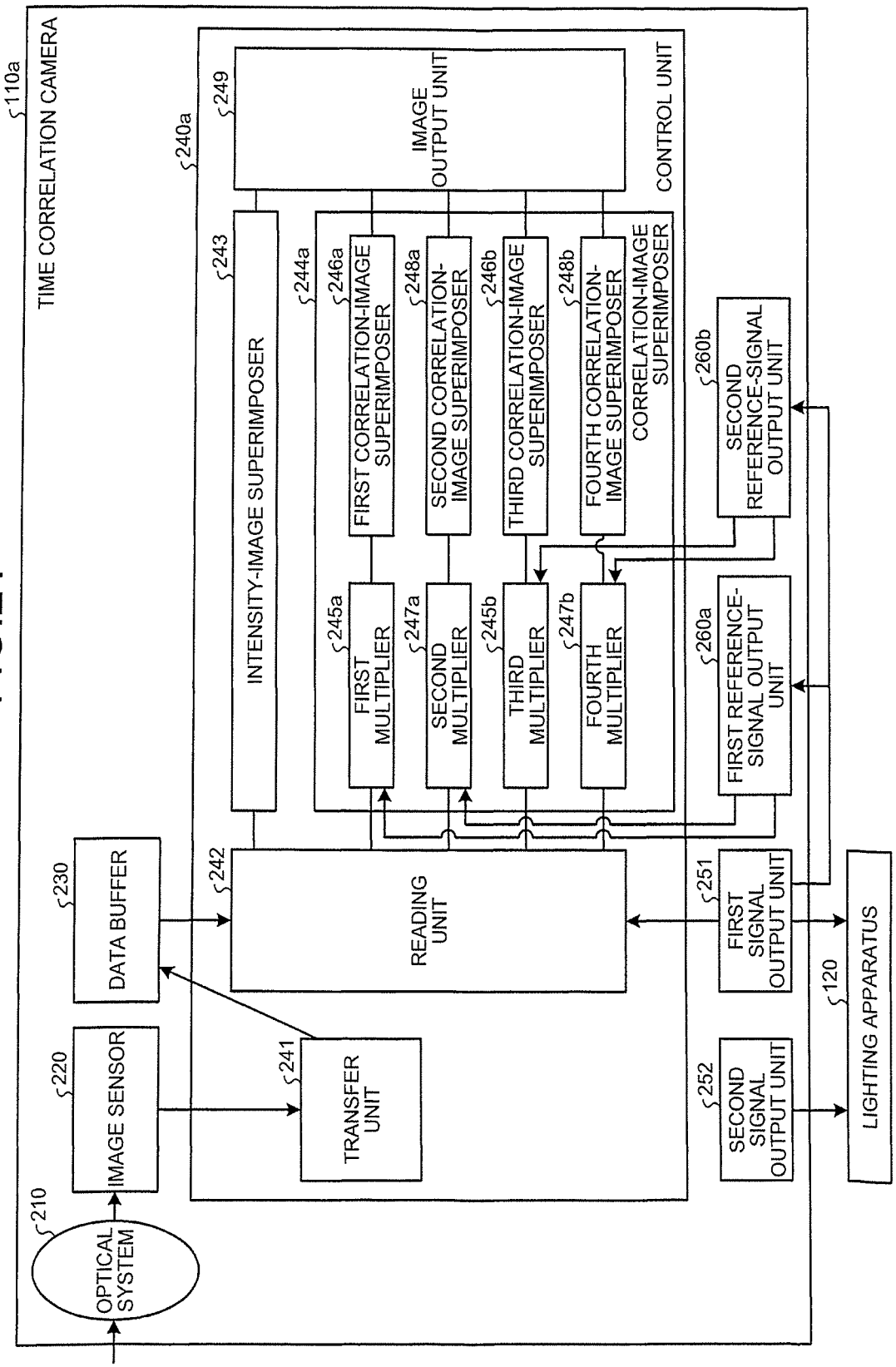
FIG. 21 is an exemplary block diagram illustrating a configuration of a time-correlation camera according to a second embodiment.

FIG. 21 is an exemplary block diagram illustrating the configuration of a time-correlation camera 110*a* according to the second embodiment. As illustrated in FIG. 21, in the time-correlation camera 110*a* of the second embodiment two units of a first reference-signal output unit 260*a* and a second reference-signal output unit 260*b* are provided as a configuration to output reference signals. Then, in a correlation-image superimposer 244*a* of a control unit 240*a* four combinations of a multiplier that multiplies a pixel value of a frame output from the image sensor 220 by a value of the reference signal, and a superimposer that superposes the multiplication result by the multiplier are provided as the configuration corresponding to the two reference-signal output units.

More specifically, the correlation-image superimposer 244*a* includes, as the configuration corresponding to the first reference-signal output unit 260*a*, two combinations of a combination of a first multiplier 245*a* and a first correlation-image superimposer 246*a* and a combination of a second multiplier 247*a* and a second correlation-image superimposer 248*a*. Similarly, the correlation-image superimposer 244*a* includes, as the configuration corresponding to the second reference-signal output unit 260*b*, two combinations of a combination of a third multiplier 245*b* and a third correlation-image superimposer 246*b* and a combination of a fourth multiplier 247*b* and a fourth correlation-image superimposer 248*b*.

The first multiplier 245*a* and the second multiplier 247*a* receive a first reference signal output from the first reference-signal output unit 260*a*, and multiply the pixel value of a frame received from the reading unit 242 by the value of the first reference signal. Then, the first correlation-image superimposer 246*a* and the second correlation-image superimposer 248*a* superpose the multiplication results by the first multiplier 245*a* and the second multiplier 247*a*, respectively. Similarly, the third multiplier 245*b* and the fourth multiplier 247*b* receive a second reference signal that is output from the second reference-signal output unit 260*b*, and multiply the pixel value of a frame received from the reading unit 242 by the value of the second reference signal. Then, the third correlation-image superimposer 246*b* and the fourth correlation-image superimposer 248*b* superpose the multiplication results by the third multiplier 245*b* and the fourth multiplier 247*b*, respectively. The waveforms and the like of the first reference signal and the second reference signal will be described in detail later, and thus the explanation thereof is omitted here.

As in the foregoing, in the second embodiment, acquired are a total of four types of time-correlation image data corresponding to four of a superimposition result of the first correlation-image superimposer 246*a*, a superimposition result of the second correlation-image superimposer 248*a*, a superimposition result of the third correlation-image superimposer 246*b*, and a superimposition result of the fourth correlation-image superimposer 248*b*. Then, in the second embodiment, the first time-correlation image corresponding to the first stripe pattern SP1 alone and the second time-correlation image corresponding to the second stripe pattern SP2 alone are generated on the basis of those four types of time-correlation image data, as with those of the above-described first embodiment.

Figure 22:
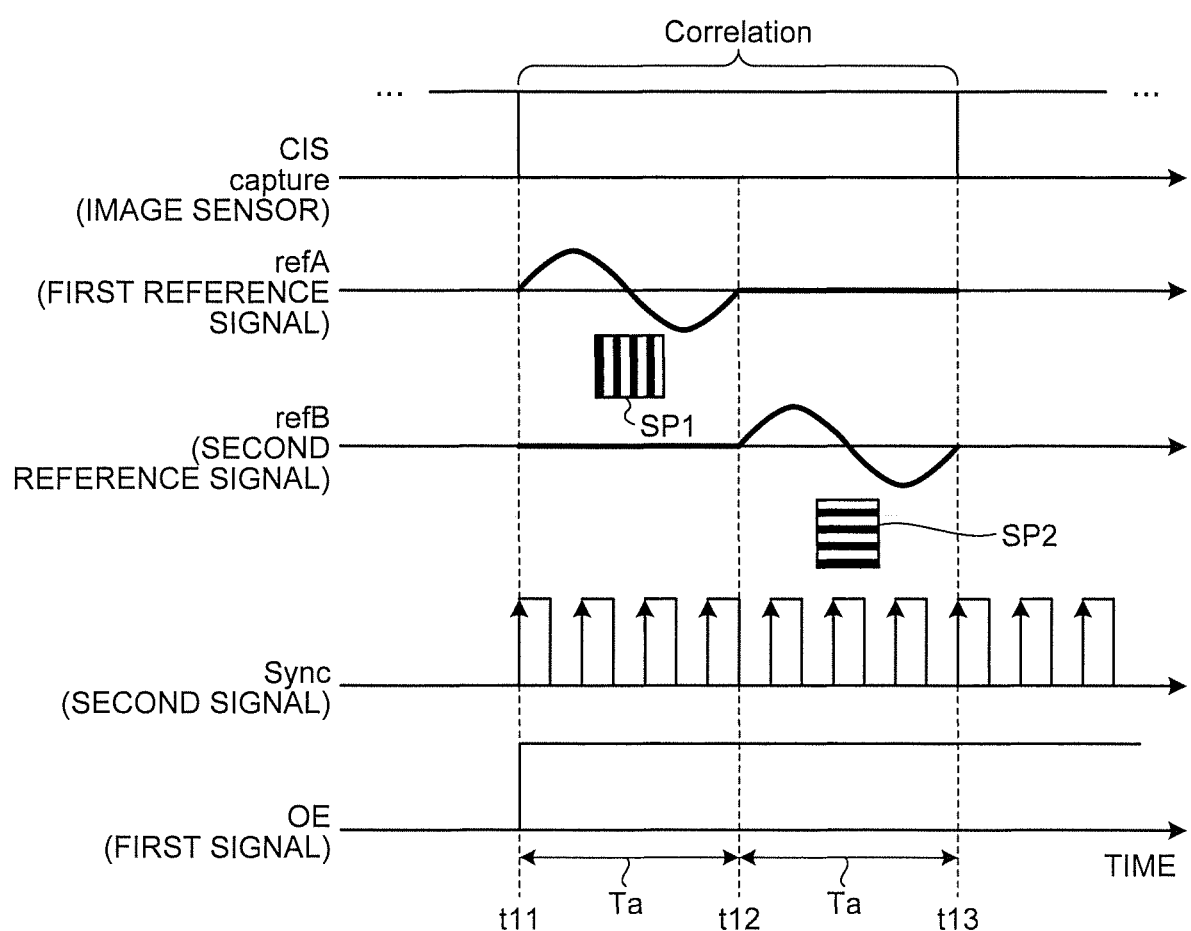
FIG. 22 is an exemplary timing chart illustrating one example of operation timings of the time-correlation camera and a lighting apparatus in the second embodiment.

The other configurations of the second embodiment are the same as those of the above-described first embodiment, and thus the explanations thereof are omitted. With reference to FIG. 22, the following describes the operation of the second embodiment in more detail.

FIG. 22 is an exemplary timing chart illustrating one example of operation timings of the time-correlation camera 110a and the lighting apparatus 120 of the second embodiment. In FIG. 22, "refA" represents the first reference signal output from the first reference-signal output unit 260a, and "refB" represents the second reference signal output from the second reference-signal output unit 260b. The other meanings of "CIS capture", "Correlation", "Sync", and "OE" are the same as those in FIG. 17 described above, and thus the explanations thereof are omitted herein. In the example illustrated in FIG. 22 also, as with the example illustrated in FIG. 17, it is assumed that the lighting apparatus 120 performs seamless switching of the first stripe pattern SP1 and the second stripe pattern SP2.

In the example illustrated in FIG. 22, at timing t11, outputting of the first signal and the second signal starts. Accordingly, the lighting apparatus 120 starts outputting a plurality of stripe patterns at the timing t11 based on the first signal, and sequentially switches the stripe patterns on the basis of the second signal. That is, the lighting apparatus 120 starts moving the first stripe pattern SP1 for one period at the timing t11 and, at timing t12 at which the moving of the first stripe pattern SP1 ends, performs switching to the second stripe pattern SP2 in a seamless manner and starts moving the second stripe pattern SP2 for one period. The moving of the second stripe pattern SP2 for one period ends at timing t13.

Also in the example illustrated in FIG. 22, as with the example illustrated in FIG. 17, the time between the timing t11 and the timing t12 and the time between the timing t12 and the timing t13 are set in equal magnitude to each other (represented by a symbol Ta). That is, in the example illustrated in FIG. 22, the time needed for the first stripe pattern SP1 to move for one period and the time needed for the second stripe pattern SP2 to move for one period are set to coincide with each other.

When outputting of the first signal starts at the timing t11, in response to that, the reading unit 242 starts reading the frame, and the first reference-signal output unit 260a and the second reference-signal output unit 260b start outputting the first reference signal and the second reference signal, respectively. As described below, the first reference signal and the second reference signal are both made up of a combination of a sine wave of a period Ta and a wave for which a fixed amplitude (for example, zero) continues for the time Ta.

The first reference signal is a signal for which the first half portion is composed of a sine wave of the period Ta and the second half portion is composed of a wave for which a fixed amplitude (for example, zero) continues for the time Ta. The second reference signal is a signal for which the first half portion is composed of a wave for which a fixed amplitude (for example, zero) continues for the time Ta and the second half portion is composed of a sine wave of the period Ta. Accordingly, it can be said that both the first reference signal and the second reference signal are signals for which the value periodically changes at the period 2Ta. In the following description, for the sake of convenience of explanation, the first half portion of the first reference signal, that is, the portion for which the value changes along with the time transition in moving the first stripe pattern SP1 for one period may be described as a third section, and the second half portion of the first reference signal, that is, the portion for which the value is constant regardless of the time transition in moving the second stripe pattern SP2 for one period may be described as a fourth section. Furthermore, the first half portion of the second reference signal, that is, the portion for which the value is constant regardless of the time transition in moving the first stripe pattern SP1 for one period may be described as a fifth section, and the second half portion of the second reference signal, that is, the portion for which the value changes along with the time transition in moving the second stripe pattern SP2 for one period may be described as a sixth section.

On the basis of the above-described first reference signal and the second reference signal, the correlation-image superimposer 244a is able to separately acquire third time-correlation image data based on the influence of the first stripe pattern SP1 alone and fourth time-correlation image data based on the influence of the second stripe pattern SP2 alone, without acquiring the time-correlation image data in which the influences of both the first stripe pattern SP1 and the second stripe pattern SP2 are mixed. That is, the correlation-image superimposer 244a can, on the basis of the first reference signal, acquire the third time-correlation image data by performing the correlation calculation (frame superimposition) one time for the period 2Ta from starting the movement of the first stripe pattern SP1 to ending the movement of the second stripe pattern SP2. Similarly, the correlation-image superimposer 244a can, on the basis of the second reference signal, acquire the fourth time-correlation image data by performing the correlation calculation one time for the period 2Ta. Explaining the contrast with the configuration that is illustrated in the foregoing FIG. 21, the third time-correlation image data corresponds to the combination of the superimposition result of the first correlation-image superimposer 246a and the second correlation-image superimposer 248a, and the fourth time-correlation image data corresponds to the superimposition result of the third correlation-image superimposer 246b and the fourth correlation-image superimposer 248b.

In the example illustrated in FIG. 22, the correlation calculation based on the first reference signal is as follows. That is, the correlation-image superimposer 244a performs the correlation calculation while multiplying the value of the third section of the first reference signal from the timing t11 to the timing t12, and performs the correlation calculation while multiplying the value of the fourth section of the first reference signal from the timing t12 to the timing t13. The former correlation calculation based on the value of the third section corresponds to the correlation calculation considering the influence of the first stripe pattern SP1 alone, and the latter correlation calculation based on the fourth section corresponds to the correlation calculation considering the influence of the second stripe pattern SP2 alone. However, as in the foregoing, because the value of the fourth section in the first reference signal is a constant value (for example, zero) regardless of the time transition, the result of the correlation calculation based on the value of the fourth section can be ignored. As a result, according to the correlation calculation based on the first reference signal composed of the third section and the fourth section extending over the period 2Ta from the timing t11 to the timing t13, it is possible to ignore the influence of the second stripe pattern SP2 and acquire the third time-correlation image data based on the influence of the first stripe pattern SP1 alone.

Similarly, in the example illustrated in FIG. 22, the correlation calculation based on the second reference signal is as follows. That is, the correlation-image superimposer 244a performs the correlation calculation while multiplying the value of the fifth section of the second reference signal from the timing t11 to the timing t12, and performs the correlation calculation while multiplying the value of the sixth section in the second reference signal from the timing t12 to the timing t13. The former correlation calculation based on the value of the fifth section corresponds to the correlation calculation considering the influence of the first stripe pattern SP1 alone, and the latter correlation calculation based on the sixth section corresponds to the correlation calculation considering the influence of the second stripe pattern SP2 alone. However, as in the foregoing, because the value of the fifth section in the second reference signal is a constant value (for example, zero) regardless of the time transition, the result of the correlation calculation based on the value of the fifth section can be ignored. As a result, according to the correlation calculation based on the second reference signal composed of the fifth section and the sixth section extending over the period 2Ta from the timing t11 to the timing t13, it is possible to ignore the influence of the first stripe pattern SP1 and acquire the fourth time-correlation image data based on the influence of the second stripe pattern SP2 alone.

As in the foregoing, according to the second embodiment, it is possible to separately acquire, on the basis of the reference signals (the first reference signal and the second reference signal) of two different systems, the third time-correlation image data based on the influence of the first stripe pattern SP1 alone and the fourth time-correlation image data based on the influence of the second stripe pattern SP2 alone, without acquiring the time-correlation image data in which the influences of both the first stripe pattern SP1 and the second stripe pattern SP2 are mixed. Then, according to the second embodiment, it is possible to generate the first time-correlation image (an image similar to that of FIG. 18 described in the first embodiment) corresponding to the first stripe pattern SP1 alone on the basis of the third time-correlation image data, and it is possible to generate the second time-correlation image (an image similar to that of FIG. 19 described in the first embodiment) corresponding to the second stripe pattern SP2 alone on the basis of the fourth time-correlation image data.

Third Embodiment

Next, the following describes a third embodiment. The third embodiment is similar to the second embodiment in that the correlation calculation is performed by using the reference signals of two systems. However, unlike the second embodiment that excludes the mixture of the influences of both the first stripe pattern SP1 and the second stripe pattern SP2 at the stage of correlation calculation, the third embodiment acquires data in which the influences of both the first stripe pattern SP1 and the second stripe pattern SP2 are mixed at the stage of the correlation calculation, and further performs calculation processing thereafter, thereby separately generating the first time-correlation image corresponding to the first stripe pattern SP1 alone and the second time-correlation image corresponding to the second stripe pattern SP2 alone.

Figure 23:
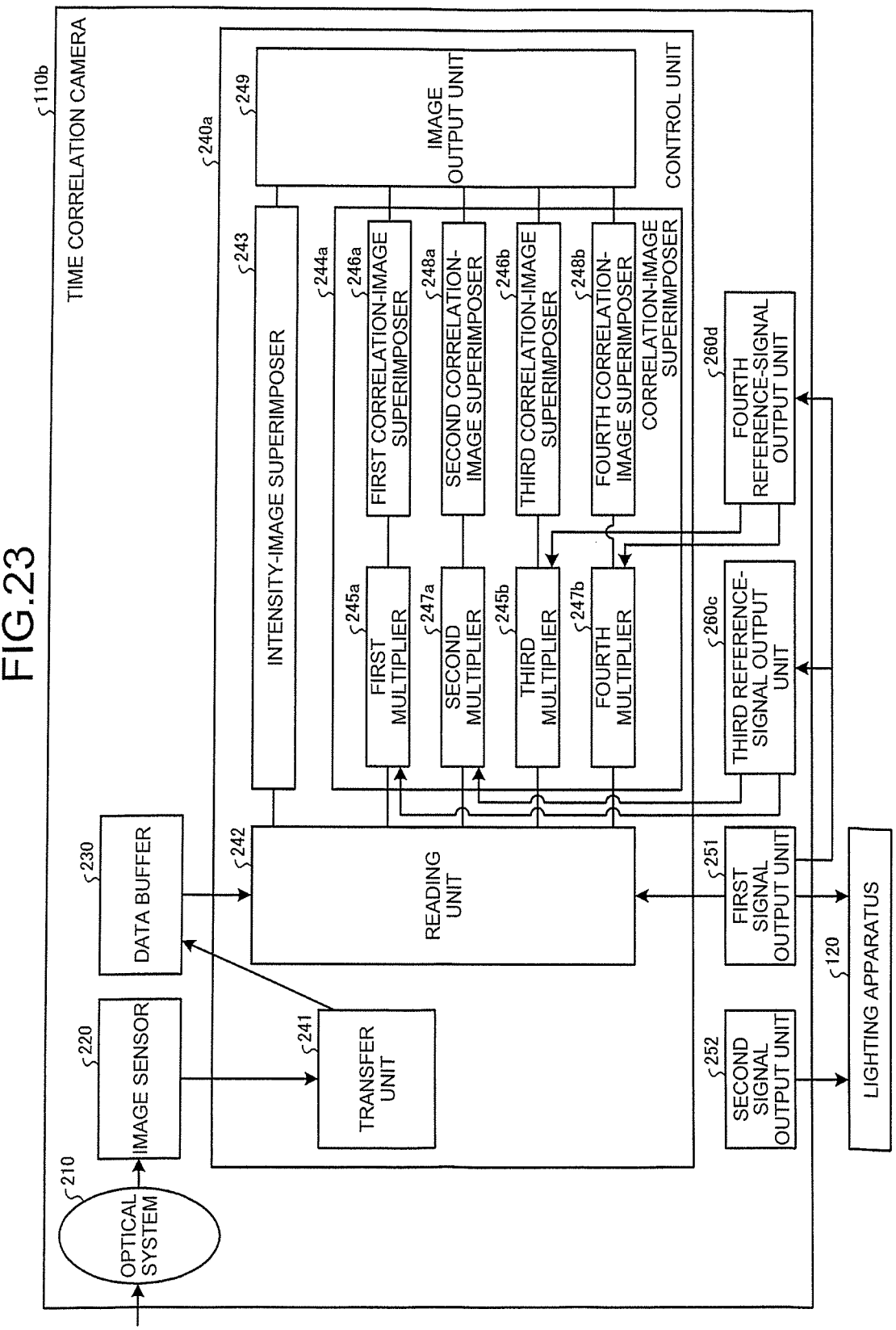
FIG. 23 is an exemplary block diagram illustrating a configuration of a time-correlation camera according to a third embodiment.

FIG. 23 is an exemplary block diagram illustrating the configuration of a time-correlation camera 110b according to the third embodiment. As illustrated in FIG. 23, the time-correlation camera 110b of the third embodiment has the configuration substantially the same as that of the time-correlation camera 110a of the second embodiment that is illustrated in FIG. 21. That is, in the time-correlation camera 110b of the third embodiment, as with the time-correlation camera 110a of the second embodiment, two configurations that output the reference signals for correlation calculation are provided, and four combinations of a multiplier to multiply a pixel value of a frame output from the image sensor 220 by a value of the reference signal and a superimposer that superposes the multiplication result by the multiplier are provided.

Figure 24:
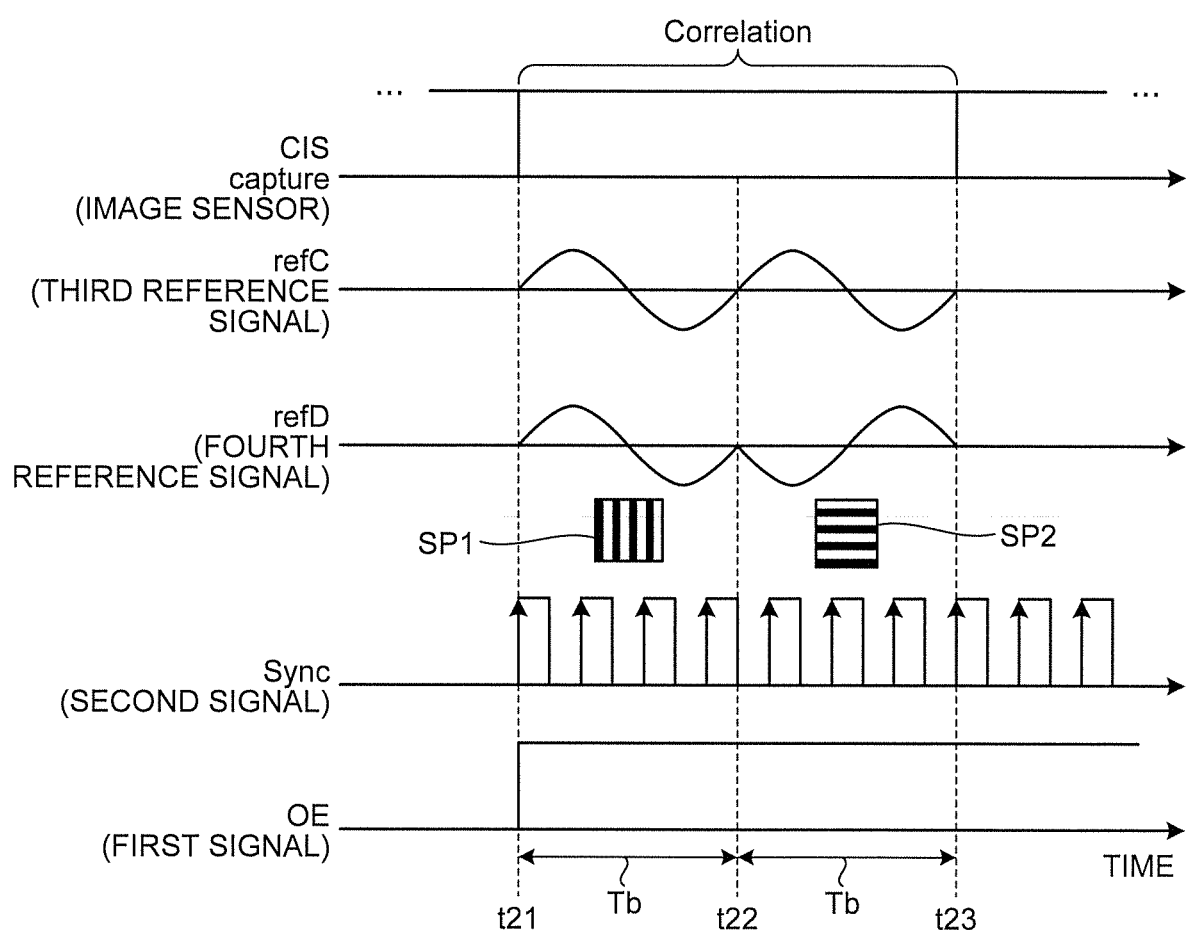
FIG. 24 is an exemplary timing chart illustrating one example of operation timings of the time-correlation camera and a lighting apparatus in the third embodiment.

However, in the third embodiment, the waveforms of the reference signals for the correlation calculation differ from those of the second embodiment. That is, in the third embodiment, provided are a third reference-signal output unit 260c that outputs a third reference signal that is different from the first reference signal and the second reference signal of the second embodiment, and a fourth reference-signal output unit 260d that outputs a fourth reference signal that is different from the first reference signal and the second reference signal of the second embodiment and is also different from the third reference signal. With reference to FIG. 24, the following describes the operation of the third embodiment in more detail.

FIG. 24 is an exemplary timing chart illustrating one example of operation timings of the time-correlation camera 110b and the lighting apparatus 120 in the third embodiment. In FIG. 24, "refC" represents the third reference signal output from the third reference-signal output unit 260c, and "refD" represents the fourth reference signal output from the fourth reference-signal output unit 260d. The other meanings of "CIS capture", "Correlation", "Sync", and "OE" are the same as those in FIG. 17 and FIG. 22 described above, and thus the explanations thereof are omitted herein. In the example illustrated in FIG. 24 also, as with the examples illustrated in FIG. 17 and FIG. 22, it is assumed that the lighting apparatus 120 performs seamless switching of the first stripe pattern SP1 and the second stripe pattern SP2.

In the example illustrated in FIG. 24, at timing t21, outputting of the first signal and the second signal starts. Accordingly, the lighting apparatus 120 starts outputting a plurality of stripe patterns at the timing t21 based on the first signal, and sequentially switches the stripe patterns on the basis of the second signal. That is, the lighting apparatus 120 starts moving the first stripe pattern SP1 for one period at the timing t21 and, at timing t22 at which the moving of the first stripe pattern SP1 ends, performs seamlessly switching to the second stripe pattern SP2 and starts moving the second stripe pattern SP2 for one period. The moving of the second stripe pattern SP2 for one period ends at timing t23.

Also in the example illustrated in FIG. 24, as with the examples illustrated in FIG. 17 and FIG. 22, the time between the timing t21 and the timing t22 and the time between the timing t22 and the timing t23 are set in equal magnitude to each other (represented by a symbol Tb). That is, in the example illustrated in FIG. 24 also, the time needed for the first stripe pattern SP1 to move for one period and the time needed for the second stripe pattern SP2 to move for one period are set to coincide with each other.

When outputting of the first signal is started at the timing t21, in response to that, the reading unit 242 starts reading the frame, and the third reference-signal output unit 260c and the fourth reference-signal output unit 260d start outputting the third reference signal and the fourth reference signal, respectively. As described below, the third reference signal and the fourth reference signal are both configured based on a sine wave of a period Tb.

The third reference signal is a signal for which the first half portion and the second half portion are composed of an identical sine wave of the period Tb. The fourth reference signal is a signal for which the first half portion is composed of a sine wave of the period Tb and the second half portion is composed of the inversion of the sine wave of the first half portion. In the following description, for the sake of convenience of explanation, the first half portion of the third reference signal may be described as a seventh section, and the second half portion of the third reference signal may be described as an eighth section. Furthermore, the first half portion of the fourth reference signal may be described as a ninth section, and the second half portion of the fourth reference signal may be described as a tenth section. In the example illustrated in FIG. 24, in the ninth section, the value changes so as to coincide with the seventh section, and the tenth section corresponds to the inversion of the eighth section. In the example illustrated in FIG. 24, the seventh section and the eighth section are composed of an identical sine wave, but as long as the seventh section and the ninth section coincide and the eighth section and the tenth section are in a relation of inversion, the seventh section and the eighth section may be not composed of an identical sine wave.

On the basis of the above-described third reference signal and the fourth reference signal, the correlation-image superimposer 244a acquires time-correlation image data in which the influences of both the first stripe pattern SP1 and the second stripe pattern SP2 are mixed. That is, the correlation-image superimposer 244a acquires the fifth time-correlation image data corresponding to the sum of the first stripe pattern SP1 and the second stripe pattern SP2, by performing the correlation calculation (frame superimposition) based on the third reference signal one time extending over the period 2Tb from starting the movement of the first stripe pattern SP1 to ending the movement of the second stripe pattern SP2. Furthermore, the correlation-image superimposer 244a acquires the sixth time-correlation image data corresponding to the difference between the first stripe pattern SP1 and the second stripe pattern SP2, by performing the correlation calculation based on the fourth reference signal one time extending over the period 2Tb.

In the example illustrated in FIG. 24, the correlation calculation based on the third reference signal is as follows. That is, the correlation-image superimposer 244a performs the correlation calculation while multiplying the value of the seventh section of the third reference signal from the timing t21 to the timing t22, and performs the correlation calculation while multiplying the value of the eighth section of the third reference signal from the timing t22 to the timing t23. The former correlation calculation based on the value of the seventh section corresponds to the correlation calculation considering the influence of the first stripe pattern SP1 alone, and the latter correlation calculation based on the eighth section corresponds to the correlation calculation considering the influence of the second stripe pattern SP2 alone. Thus, the correlation calculation based on the value of the third reference signal composed of the seventh section and the eighth section extending over the period 2Tb from the timing t21 to the timing t23 corresponds to the sum of the correlation calculation considering the influence of the first stripe pattern SP1 alone and the correlation calculation considering the influence of the second stripe pattern SP2 alone. As a result, according to the correlation calculation based on the third reference signal extending over the period 2Tb, the fifth time-correlation image data corresponding to the sum of the first stripe pattern SP1 and the second stripe pattern SP2 is acquired.

Similarly, in the example illustrated in FIG. 24, the correlation calculation based on the fourth reference signal is as follows. That is, the correlation-image superimposer 244a performs the correlation calculation while multiplying the value of the ninth section of the fourth reference signal from the timing t21 to the timing t22, and performs the correlation calculation while multiplying the value of the tenth section of the fourth reference signal from the timing t22 to the timing t23. As in the foregoing, the ninth section of the fourth reference signal corresponds to the seventh section of the third reference signal, and the tenth section of the fourth reference signal corresponds to the inversion of the eighth section of the third reference signal. Thus, the correlation calculation based on the value of the fourth reference signal composed of the ninth section and the tenth section extending over the period 2Tb from the timing t21 to the timing t23 corresponds to the difference between the correlation calculation considering the influence of the first stripe pattern SP1 alone and the correlation calculation considering the influence of the second stripe pattern SP2 alone. As a result, according to the correlation calculation based on the fourth reference signal extending over the period 2Tb, the sixth time-correlation image data corresponding to the difference between the first stripe pattern SP1 and the second stripe pattern SP2 is acquired.

As just described, according to the third embodiment, it is possible to acquire, on the basis of the reference signals (the third reference signal and the fourth reference signal) of two different systems, the fifth time-correlation image data corresponding to the sum of the first stripe pattern SP1 and the second stripe pattern SP2 and to acquire the sixth time-correlation image data corresponding to the difference between the first stripe pattern SP1 and the second stripe pattern SP2.

That is, when each of the fifth time-correlation image data and the sixth time-correlation image data is expressed by a conceptual expression, it is expressed as follows.

Fifth time-correlation image data=first stripe pattern SP1+second stripe pattern SP2

Sixth time-correlation image data=first stripe pattern SP1−second stripe pattern SP2

According to the foregoing two conceptual expressions, the following two conceptual expressions can further be obtained.

Fifth time-correlation image data=sixth time-correlation image data=2×first stripe pattern SP1

Fifth time-correlation image data=sixth time-correlation image data=2×second stripe pattern SP2

Thus, according to the third embodiment, it is possible to generate the first time-correlation image corresponding to the first stripe pattern SP1 alone on the basis of the sum of the fifth time-correlation image data and the sixth time-correlation image data, and it is possible to generate the second time-correlation image corresponding to the second stripe pattern SP2 alone on the basis of the difference between the fifth time-correlation image data and the sixth time-correlation image data.

Figure 25:
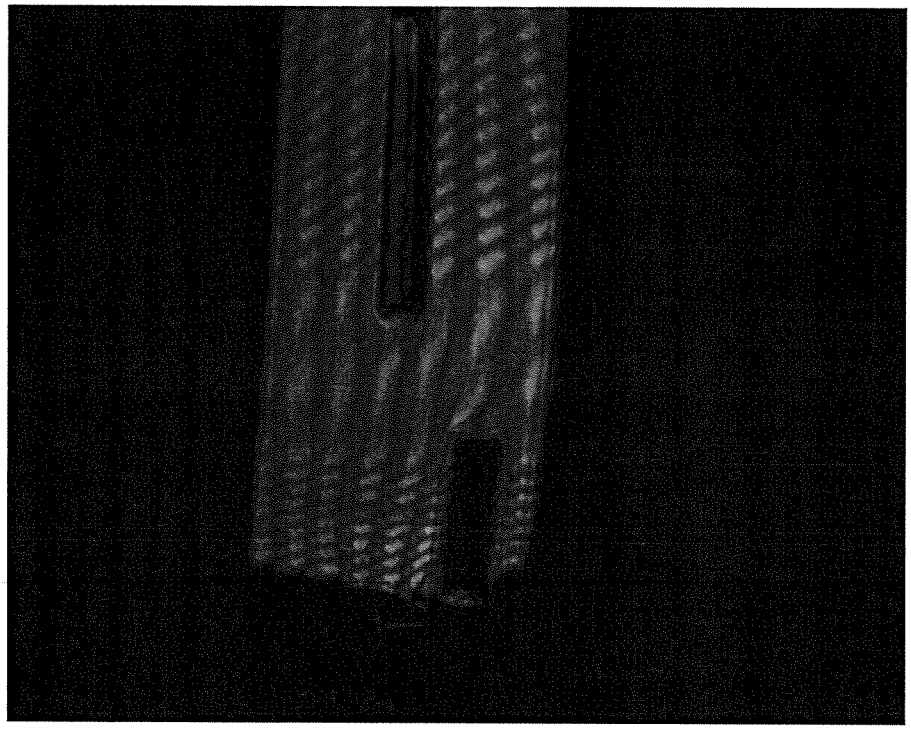
FIG. 25 is an exemplary diagram illustrating a specific example of fifth time-correlation image data that is output from the time-correlation camera in the third embodiment.
Figure 26:
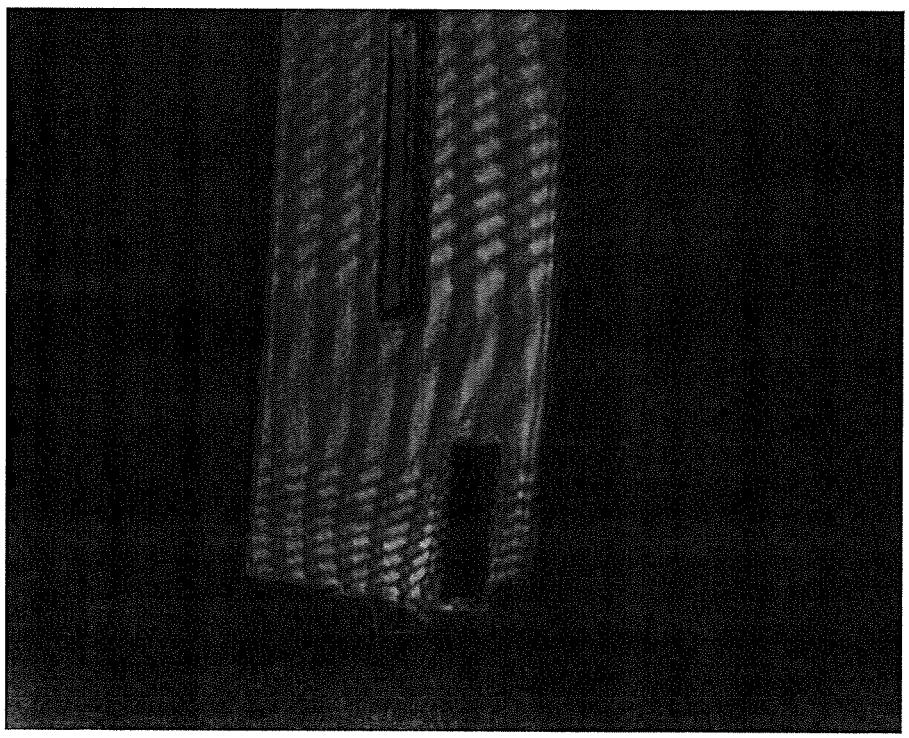
FIG. 26 is an exemplary diagram illustrating a specific example of sixth time-correlation image data that is output from the time-correlation camera in the third embodiment.
Figure 27:
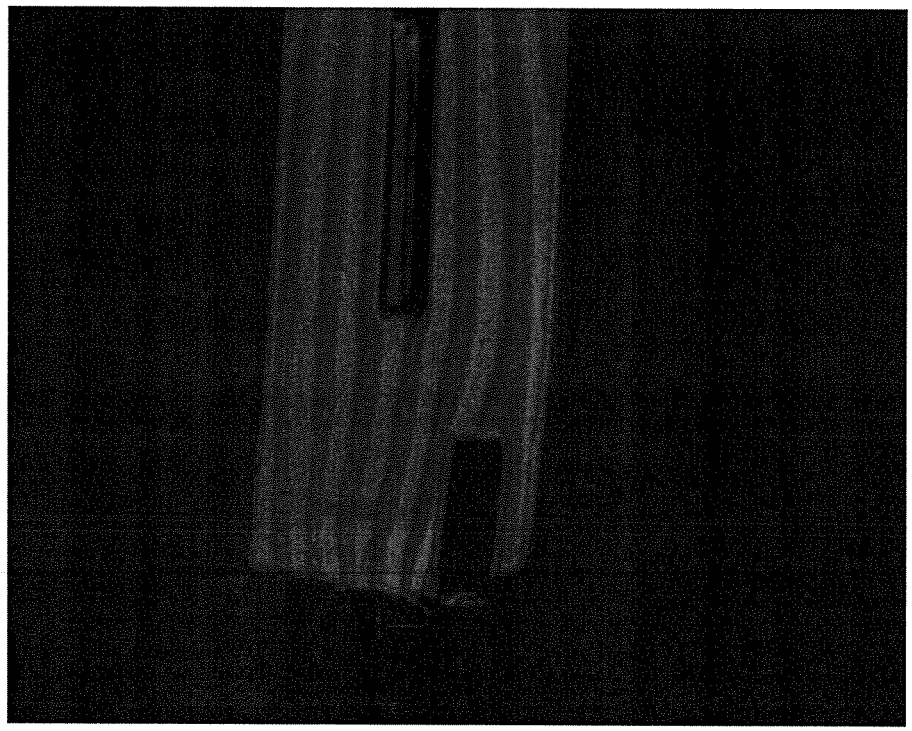
FIG. 27 is an exemplary diagram illustrating a specific example of a first time-correlation image generated from the data of FIG. 25 and FIG. 26 in the third embodiment.
Figure 28:
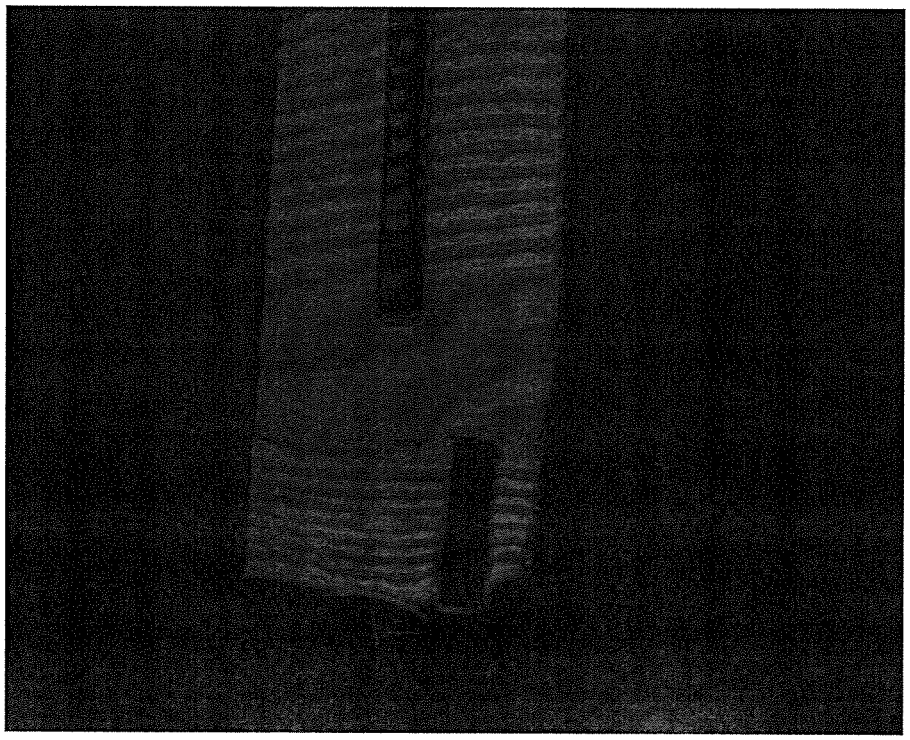
FIG. 28 is an exemplary diagram illustrating a specific example of a second time-correlation image generated together with the first time-correlation image in FIG. 27 in the third embodiment.

FIG. 25 is an exemplary diagram illustrating a specific example of the fifth time-correlation image data that is output from the time-correlation camera 110b in the third embodiment, and FIG. 26 is an exemplary diagram illustrating a specific example of the sixth time-correlation image data that is output from the time-correlation camera 110b in the third embodiment. Furthermore, FIG. 27 is an exemplary diagram illustrating a specific example of the first time-correlation image generated from the data of FIG. 25 and FIG. 26 in the third embodiment, and FIG. 28 is an exemplary diagram illustrating a specific example of the second time-correlation image generated together with the first time-correlation image of FIG. 27 in the third embodiment.

As illustrated in FIG. 25 and FIG. 26, according to the third embodiment, it is possible to obtain two different types of data in which the influences of both the first stripe pattern SP1 and the second stripe pattern SP2 are mixed. Then, as illustrated in FIG. 27 and FIG. 28, according to the third embodiment, by performing the further calculation processing on the two different types of data in which the influences of both the first stripe pattern SP1 and the second stripe pattern SP2 are mixed, it is possible to separately generate the first time-correlation image based on the influence of the first stripe pattern SP1 alone and the second time-correlation image based on the influence of the second stripe pattern SP2 alone.

An inspection program executed by the PC 100 of the above-described embodiments is provided in a file of an installable format or of an executable format recorded on a computer readable recording medium such as a CD-ROM, a flexible disk (FD), a CD-R, and a DVD (digital versatile disc).

Furthermore, the inspection program executed by the PC 100 of the above-described embodiments may be stored in a computer connected to a network such as the Internet, and be provided by downloading via the network. The inspection program executed by the PC 100 of the above-described embodiments may be provided or distributed via a network such as the Internet.

As in the foregoing, although the several embodiments and the modifications of the present invention have been exemplified, these embodiments and the modifications described herein are presented as mere examples and are not intended to limit the scope of the invention. Those novel embodiments and the modifications described herein may be embodied in various other forms, and without departing from the spirit of the invention, various omissions, substitutions, and modifications can be made. Those embodiments and the modifications thereof are included in the scope and spirit of the invention and are included in the scope of the invention stated in the appended claims and the scope of the equivalents thereof.

The invention claimed is:

1. An inspection system comprising:
    an illuminator that provides periodic temporal changes and spatial changes in intensity of light to an inspection subject by sequentially and seamlessly switching and outputting a plurality of stripe patterns so that a first stripe pattern extending in a first direction moves in a second direction intersecting with the first direction for one period and thereafter a second stripe pattern extending in the second direction moves in the first direction for one period;
    an image sensor that is used in a time-correlation camera or in an image capturing system that performs an operation equivalent to that of the time-correlation camera; and
    at least one processor configured to:
    output to the illuminator the first and second stripe patterns;
    output to the illuminator a first signal different from the first and second stripe patterns, the first signal serving as a trigger to start outputting the first and second stripe patterns;
    output to the illuminator a second signal different from the first and second stripe patterns and the first signal, the second signal serving as a trigger to switch between the first stripe pattern and the second stripe pattern;
    acquire, by starting superposition of frames output from the image sensor at a timing based on the first signal, time-correlation image data in which an inspection target surface of the inspection subject being illuminated by the illumination unit illuminator is captured;
    generate a first time correlation image and a second time-correlation image based on the time-correlation image data, the first time correlation image corresponding to the first stripe pattern alone, the second time-correlation image corresponding to the second stripe pattern alone; and
    detect, based on the first time-correlation image and the second time correlation image, an abnormality on the inspection target surface.

2. The inspection system according to claim 1, wherein the at least one processor is configured to:
    start outputting a reference signal at a timing based on the first signal, the reference signal having a first section and a second section, the first section being a section in which a value changes along with time transition while moving the first stripe pattern for one period, the second section being a section in which a value changes along with time transition while moving the second stripe pattern for one period;
    acquire first time correlation image data and second time-correlation image data by superposing frames output from the image sensor while multiplying the value of the reference signal at an output timing of the frame, the first time-correlation image data being a superimposition result based on the value of the first section until the first stripe pattern is switched to the second stripe pattern, the second time-correlation image data being a superimposition result based on the value of the second section after having switched to the second stripe pattern from the first stripe pattern; and
    generate the first time-correlation image based on the first time-correlation image data and generates the second time-correlation image based on the second time-correlation image data.

3. The inspection system according to claim 1, wherein the at least one processor configured to:
    start outputting a first reference signal at a timing based on the first signal, the first reference signal having a third section and a fourth section, the third section being a section in which a value changes along with time transition while moving the first stripe pattern for one period, the fourth section being a section in which a value is constant regardless of time transition while moving the second stripe pattern for one period;
    start outputting a second reference signal at a timing based on the first signal, the second reference signal having a fifth section and sixth section, the fifth section being a section in which a value is constant regardless of time transition while moving the first stripe pattern for one period, the sixth section being a section in which a value changes along with time transition while moving the second stripe pattern for one period;
    acquire third time correlation image data and fourth time-correlation image data by superposing frames output from the image sensor while multiplying the values of the first reference signal and the second reference signal at an output timing of the frame, the third time-correlation image data being a superimposition result based on the value of the third section and the fourth section of the first reference signal from starting a movement of the first stripe pattern for one period to ending a movement of the second stripe pattern for one period, the fourth time-correlation image data being a superimposition result based on the value of the fifth section and the sixth section of the second reference signal from starting a movement of the first stripe pattern for one period to ending a movement of the second stripe pattern for one period; and generate the first time-correlation image based on the third time-correlation image data and generates the second time-correlation image based on the fourth time-correlation image data.

4. The inspection system according to claim 1, wherein the at least one processor is configured to:

start outputting a third reference signal at a timing based on the first signal, the third reference signal having a seventh section and an eighth section, the seventh section being a section in which a value changes along with time transition while moving the first stripe pattern for one period, the eighth section being a section in which a value changes along with time transition while moving the second stripe pattern for one period;

start outputting a fourth reference signal at a timing based on the first signal, the fourth reference signal having a ninth section and a tenth section, the ninth section being a section in which a value changes so as to coincide with the value of the seventh section while moving the first stripe pattern for one period, the tenth section being a section in which a value changes so as to correspond to inversion of the value of the eighth section while moving the second stripe pattern for one period;

acquire fifth time-correlation image data and sixth time-correlation image data by superposing frames output from the image sensor while multiplying the values of the third reference signal and the fourth reference signal at an output timing of the frame, the fifth time-correlation image data being a superimposition result based on the value of the seventh section and the eighth section of the third reference signal from starting a movement of the first stripe pattern for one period to ending a movement of the second stripe pattern for one period, the sixth time-correlation image data being a superimposition result based on the value of the ninth section and the tenth section of the fourth reference signal from starting a movement of the first stripe pattern for one period to ending a movement of the second stripe pattern for one period; and generate the first time correlation image based on a sum of the fifth time-correlation image data and the sixth time-correlation image data, generate the second time-correlation image based on a difference between the fifth time-correlation image data and the sixth time-correlation image data.

5. An inspection method comprising:

an illumination step that provides periodic temporal changes and spatial changes in intensity of light to an inspection subject by an illuminator that sequentially and seamlessly switches and outputs a plurality of stripe patterns so that a first stripe pattern extending in a first direction moves in a second direction intersecting with the first direction for one period and thereafter a second stripe pattern extending in the second direction moves in the first direction for one period;

a stripe patterns output step that outputs to the illuminator the first and second stripe patterns;

a first signal output step that outputs to the illuminator a first signal different from the first and second stripe patterns, the first signal serving as a trigger to start outputting the stripe patterns;

a second signal output step that outputs to the illuminator a second signal different from the first and second stripe patterns and the first signal, the second signal serving as a trigger to switch between the first stripe pattern and the second stripe pattern;

an image-data acquisition step that acquires, by starting superimposition of frames output from an image sensor at a timing based on the first signal, time correlation image data in which an inspection target surface of the inspection subject being illuminated by the illumination step is captured, the image sensor being used in a time-correlation camera or in an imaging system that performs an operation equivalent to that of the time correlation camera;

an image generation step that generates a first time correlation image and a second time-correlation image based on the time-correlation image data, the first time-correlation image corresponding to the first stripe pattern alone, the second time-correlation image corresponding to the second stripe pattern alone; and an abnormality detection step that detects, based on the first time-correlation image and the second time-correlation image, an abnormality on the inspection target surface.

* * * * *